United States Patent
Chiba et al.

(10) Patent No.: US 12,420,206 B2
(45) Date of Patent: Sep. 23, 2025

(54) INFORMATION PROCESSING SYSTEM, INFORMATION PROCESSING METHOD, AND NONTRANSITORY STORAGE MEDIUM

(71) Applicant: Konami Digital Entertainment Co., Ltd., Tokyo (JP)

(72) Inventors: Shigeru Chiba, Tokyo (JP); Kai Inoue, Tokyo (JP); Junki Hirai, Tokyo (JP); Akira Sakai, Tokyo (JP); Tsuguo Shinpo, Tokyo (JP); Toshiaki Kanahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 389 days.

(21) Appl. No.: 17/949,705

(22) Filed: Sep. 21, 2022

(65) Prior Publication Data
US 2023/0018547 A1 Jan. 19, 2023

Related U.S. Application Data

(63) Continuation of application No. PCT/JP2021/002829, filed on Jan. 27, 2021.

(30) Foreign Application Priority Data

Mar. 31, 2020 (JP) .................. 2020-063920

(51) Int. Cl.
*A63F 13/87* (2014.01)
*A63F 13/45* (2014.01)

(52) U.S. Cl.
CPC .............. *A63F 13/87* (2014.09); *A63F 13/45* (2014.09)

(58) Field of Classification Search
CPC ........ A63F 13/87; A63F 13/45; A63F 13/352; A63F 13/52; A63F 13/812; A63F 13/86;
(Continued)

(56) References Cited

U.S. PATENT DOCUMENTS

| 2010/0041457 A1* | 2/2010 | Cook ................. A63F 13/533 463/43 |
| 2014/0012924 A1* | 1/2014 | Jagernauth ............. G06Q 50/10 709/204 |

FOREIGN PATENT DOCUMENTS

| CN | 110418151 A | 11/2019 |
| JP | 2016-21251 A | 2/2016 |
| JP | 2019-213933 A | 12/2019 |

OTHER PUBLICATIONS

Robin Fontaine, "Introducing Cheering: Celebrate, together.", Jul. 27, 2016, https://blog.twitch.tv/en/2016/06/27/introducing-cheering-celebrate-together-da62af41fac6/ (Year: 2016).*

(Continued)

*Primary Examiner* — Kevin Y Kim
(74) *Attorney, Agent, or Firm* — Sughrue Mion, PLLC

(57) ABSTRACT

An information processing system (1) includes: a first terminal (20) that controls progress of a game; and a second terminal (10) that is communicably connected with the first terminal (20) and that does not have a function to control progress of the game. The second terminal (10) includes a transmitting section (113) that transmits, in accordance with manipulation carried out by a user with respect to the second terminal (10), message information including at least (i) a message and (ii) information indicating a scene which is included in a game space where the game progresses and in which the message is to be displayed. The first terminal (20) includes a receiving section (212) that receives the message (Continued)

information and a message display section (213) that displays the message in the scene in accordance with the message information.

10 Claims, 20 Drawing Sheets

(58) Field of Classification Search
CPC ........ A63F 13/53; A63F 13/792; A63F 13/30; G06Q 50/10; H04N 21/4781
See application file for complete search history.

(56) References Cited

OTHER PUBLICATIONS

Wayneout, "Add comment at specific point on level," Mar. 10, 2016, GameFAQs, https://gamefaqs.gamespot.com/boards/805618-super-mario-maker/73419707 (Year: 2016).*
Office Action dated May 18, 2021 issued by the Japanese Patent Office in Japanese Application No. 2020-063920.
Written Opinion of the International Searching Authority dated Mar. 30, 2021 in International Application No. PCT/JP2021/002829.
International Search Report dated Mar. 30, 2021 in International Application No. PCT/JP2021/002829.
"Finally Compatible with YouTube and Smartphone Livestreaming—'Tip' Comment Function Available Too.", CNET Japan. [online], Feb. 7, 2017, Retrieved from: https://japan.CNET.COM/ARTICLE/35096227/ (4 pages total).
Communication dated Jul. 16, 2024 from the Korean Intellectual Property Office in Application No. 10-2022-7029935.
"You Tube super chat introduction, and the perception of the real-time live broadcasting is changed", <https://blog.naver.com/lbizblog/220914883067>, retrieved Jun. 13, 2024, 4 pages total.
Communication dated Aug. 3, 2024 from the State Intellectual Property Office of P.R. of China in Application No. 202180018544.9.
Yominer, "Teaches you to do a premium screen making tutorial that will rotate! Pups should be rescued", uploader: Explanation Seven Dary, upload Time: Aug. 27, 2019, source: mile beep, web address: https: //b23. Tv/cJygVzz, 3 pages total.
Communication issued Dec. 11, 2024 in Chinese Application No. 202180018544.9.
Communication issued Mar. 4, 2025 in Chinese Application No. 202180018544.9.
Communication dated May 24, 2025 in Chinese Application No. 202180018544.9.

* cited by examiner

| DISPLAY TIMING | DISPLAY SCENE | | |
|---|---|---|---|
| 6TH INNING, SWITCH BETWEEN OFFENCE AND DEFENSE | UNSELECTABLE | | |
| 6TH INNING, END OF THE INNING | UNSELECTABLE | | |
| NO DESIGNATION (ANY TIME) | FIRST-BASE BANNER | THIRD-BASE BANNER | FENCE UNDER BACKSTOP NET |

| CONSUMED AMOUNT | DISPLAY PERIOD | FOCUS |
|---|---|---|
| 0~499 | 1 MIN. | 2 |
| 500~1000 | 5 MIN. | 5 |
| ... | ... | ... |

| COMMAND ID | MESSAGE | TRANSMITTER | TIMING | DISPLAY POSITION | DISPLAY PERIOD | FOCUS |
|---|---|---|---|---|---|---|
| 0001 | LET'S GO, XX! | △△ | NO DESIGNATION | FENCE UNDER BACKSTOP NET | 5 MIN. | 5 |
| 0002 | BE RELENTLESS AND AMBITIOUS | ×× | 6TH INNING, SWITCH BETWEEN OFFENCE AND DEFENSE | FIRST-BASE BANNER | --- | 2 |
| ... | ... | ... | ... | ... | ... | ... |

| SCENE | CONSUMED AMOUNT |
|---|---|
| FIRST-BASE BANNER | 500 |
| THIRD-BASE BANNER | 0 |
| FENCE UNDER BACKSTOP NET | 2000 |

| USER ID | USER NAME | NO. OF POSSESSED COINS | NO. OF POSSESSED TICKETS |
|---------|-----------|------------------------|--------------------------|
| 0001    | △△        | 1000                   | 1                        |
| 0002    | ××        | 1538                   | 0                        |
| ...     | ...       | ...                    | ...                      |

| COLLECTION ID | COLLECTION SUBJECT | COLLECTION PERIOD | PROMPT DECISION | THRESHOLD |
|---------------|--------------------|--------------------|-----------------|-----------|
| 0001 | TIMING IS AT SWITCH BETWEEN OFFENSE AND DEFENSE IN 6TH INNING | FROM START TO END OF TOP OF 6TH INNING | WITHOUT | --- |
| 0002 | TIMING IS 17:00 | FROM 16:00 TO 16:50 | WITH | 1999 |
| ... | ... | ... | ... | ... |

FIG. 32

| CONSUMED AMOUNT | SOUND VOLUME | SOUND EFFECT |
|---|---|---|
| 0~499 | 3 | — |
| 500~1000 | 5 | ECHO |
| ... | ... | ... |

FIG. 33

| COMMAND ID | MESSAGE | TRANSMITTER | TIMING | SOUND SOURCE | SOUND VOLUME | EFFECT |
|---|---|---|---|---|---|---|
| 0001 | LET'S GO, XX! | △△ | NO DESIGNATION | SPECTATORS | 3 | — |
| 0002 | BE RELENTLESS AND AMBITIOUS | ×× | 6TH INNING, SWITCH BETWEEN OFFENCE AND DEFENSE | STADIUM ANNOUNCER | 5 | ECHO |
| ... | ... | ... | ... | ... | ... | ... |

INFORMATION PROCESSING SYSTEM, INFORMATION PROCESSING METHOD, AND NONTRANSITORY STORAGE MEDIUM

CROSS-REFERENCE TO RELATED APPLICATIONS

This application is a Continuation of PCT International Application No. PCT/JP2021/002829 filed in Japan on Jan. 27, 2021, which claims the benefit of Patent Application No. 2020-063920 filed in Japan on Mar. 31, 2020, the entire contents of which are hereby incorporated by reference.

TECHNICAL FIELD

The present invention relates to a technique for transmitting a message to a game screen.

BACKGROUND ART

Patent Literature 1 discloses a technique according to which a viewer can transmit a message in response to information uploaded by a user.

CITATION LIST

Patent Literature

Patent Literature 1
Japanese Patent Application Publication Tokukai No. 2016-21251 (Publication date: Feb. 4, 2016)

SUMMARY OF INVENTION

Technical Problem

Recently, real-time distribution (live distribution) of a moving image obtained by photographing or capturing of a game screen during playing of a game is carried out. When a viewer of the real-time distribution transmits, by the above-described technique, a message to a game screen of the live-distributed game, it is difficult for a player of the game to notice the message transmitted from the viewer, since the player is concentrated on playing the game.

An aspect of the present invention has an object to provide a technique that allows a player of a game to more easily notice a message that a viewer has transmitted to a game screen during live distribution of the game.

Solution to Problem

In order to attain the above object, an information processing system in accordance with an aspect of the present invention includes: at least one first terminal that controls progress of a game; and at least one second terminal that is communicably connected with the at least one first terminal and that does not have a function to control progress of the game, the at least one second terminal including a transmitting section that transmits, in accordance with manipulation carried out by a user with respect to the at least one second terminal, message information including at least (i) a message and (ii) information indicating a scene which is included in a game space where the game progresses and in which the message is to be displayed, the at least one first terminal including a receiving section that receives the message information, and a message display section that displays the message in the scene in accordance with the message information.

An information processing method in accordance with an aspect of the present invention includes the steps of: transmitting, by a second terminal being communicably connected with a first terminal that controls progress of a game and not having a function to control progress of the game, message information in accordance with manipulation carried out by a user with respect to the second terminal, the message information including at least (i) a message and (ii) information indicating a scene which is included in a game space where the game progresses and in which the message is to be displayed; receiving, by the first terminal, the message information; and displaying, by the first terminal, the message in the scene in accordance with the message information.

A program in accordance with an aspect of the present invention causes a computer, included in a second terminal being communicably connected with a first terminal that controls progress of a game and not having a function to control progress of the game, to execute the steps of: obtaining manipulation information indicating manipulation carried out by a user with respect to the second terminal; and transmitting, in accordance with the manipulation information, message information to the first terminal, the message information including at least (i) a message and (ii) information indicating a scene which is included in a game space where the game progresses in the first terminal and in which the message is to be displayed.

A program in accordance with another aspect of the present invention causes a computer, included in a first terminal that controls progress of a game, to execute the steps of: receiving message information from a second terminal (i) that is communicably connected with the first terminal, (ii) that does not have a function to control progress of the game, and (iii) that includes a transmitting section which transmits the message information in accordance with manipulation carried out by a user with respect to the second terminal, the message information including at least (i) a message and (ii) information indicating a scene which included in a game space where the game progresses and in which the message is to be displayed; and displaying the message in the scene in accordance with the message information.

Advantageous Effects of Invention

In accordance with an aspect of the present invention, it is possible to provide a technique that allows a player of a game to more easily notice a message that a viewer has transmitted to a game screen during live distribution of the game.

BRIEF DESCRIPTION OF DRAWINGS

FIG. 32 is a table illustrating an example of output mode setting data in accordance with Embodiment 3 of the present invention.

FIG. 33 is a view illustrating an example of message information to be transmitted from a game server to a player terminal in Embodiment 3 of the present invention.

DESCRIPTION OF EMBODIMENTS

Embodiment 1

First, the following description will discuss, with reference to FIGS. 1 to 24, an information system 1 in accordance with Embodiment 1.

(Configuration of Information Processing System 1)

Figure 1:
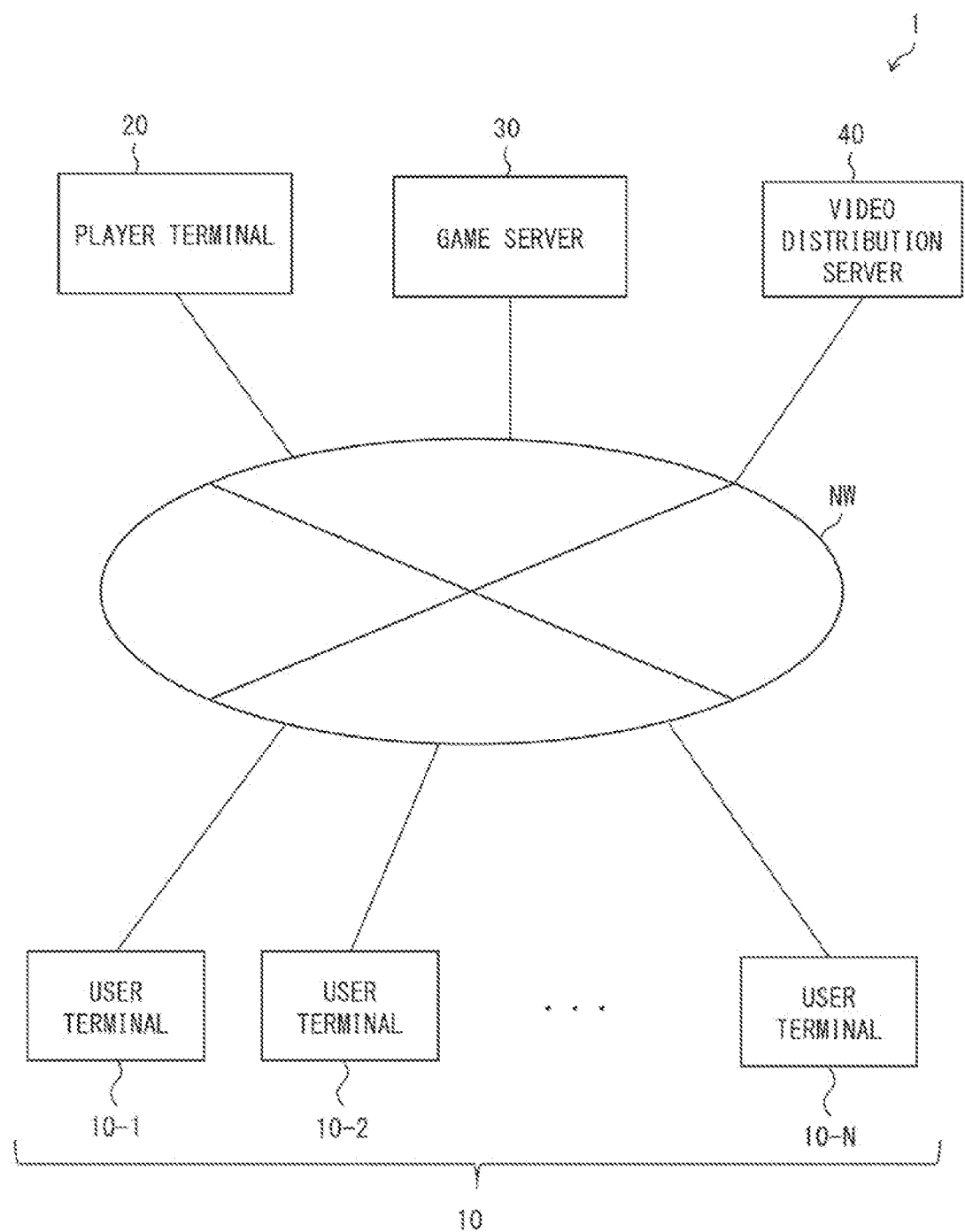
FIG. 1 is a block diagram illustrating an example of a configuration of an information processing system in accordance with Embodiment 1 of the present invention.

FIG. 1 is a block diagram illustrating an example of a configuration of the information processing system 1. The information processing system 1 includes user terminals 10-1, 10-2, . . . 10-N, a player terminal 20, a game server 30, and a video distribution server 40. These devices are connected with each other via a network NW such as the Internet. The user terminals 10-1, 10-2, . . . 10-N have the same configuration. Therefore, in a case where the user terminals 10-1, 10-2, . . . 10-N are not particularly distinguished, the letters "-1", "-2", and the like will be omitted and the user terminals 10-1, 10-2, . . . 10-N will be described as the user terminal 10.

The player terminal 20 (one example of the first terminal) is a computer to be manipulated by a player who is playing a game. The user terminal 10 (one example of the second terminal) is a computer to be manipulated by a user who is not playing the game. Hereinafter, an operator who manipulates the first terminal to play a game that progresses in the player terminal 20 is called a player, whereas an operator who manipulates the user terminal 10 is called a user. Note that the user may be a person who views the game played by the player.

The player terminal 20 and the user terminal 10 are constituted by physically different computers, and are communicably connected with each other directly or via another server or the like. Each of the player terminal 20 and the user terminal 10 may be a home-use game machine, a smartphone, a tablet computer, a personal computer, an in-store business-use game machine, or the like.

For example, the player terminal 20 may be a home-use game machine or an in-store business-use game machine in which a certain game is executed, and the user terminal 10 may be a smartphone, a tablet computer, or a personal computer in which the certain game cannot be executed.

For another example, the player terminal 20 may be a home-use game machine, a smartphone, a tablet computer, a personal computer, an in-store business-use game machine, or the like in which a certain game application is executed, and the user terminal 10 may be a home-use game machine, a smartphone, a tablet computer, a personal computer, an in-store business-use game machine, or the like in which the certain game application is not executed while the certain game application is executed in the player terminal 20.

In a case where the information processing system 1 includes a plurality of user terminals 10, the plurality of user terminals 10 may be different kinds of devices.

Each of the game server 30 (one example of the server) and the video distribution server 40 is constituted by a computer, and is communicably connected with the player terminal 20 and the user terminal 10. Each of the game server 30 and the video distribution server 40 functions as a server that provides a service to the player terminal 20 and the user terminal 10 via the network NW. For example, the game server 30 provides (i) a service such as matching fighting at a game and/or management of an item(s) and/or a point(s) possessed by a user and (ii) a message processing service described herein. The video distribution server 40 provides a video distribution service.

(Hardware Configuration of User Terminal 10)

Figure 2:
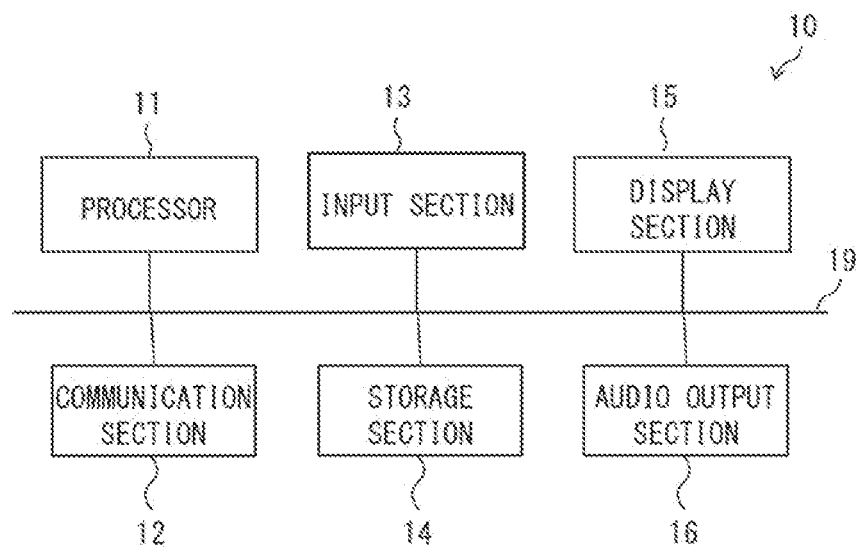
FIG. 2 is a view illustrating an example of a hardware configuration of a user terminal in accordance with Embodiment 1 of the present invention.

FIG. 2 is a view illustrating an example of a hardware configuration of the user terminal 10 in accordance with Embodiment 1. The user terminal 10 includes, for example, a processor 11, a communication section 12, an input section 13, a storage section 14, a display section 15, and an audio output section 16. The user terminal 10 communicates, via the communication section 12, with the game server 30, the video distribution server 40, another device, and the like that are connected with the user terminal 10 via the network NW. These elements are connected with each other via a bus 19 such that the elements can communicate with each other. The processor 11 executes various programs stored in the storage section 14 to control each section in the user terminal 10. The processor 11 can be constituted by, e.g., an integrated circuit such as a central processing unit (CPU) or a graphics processing unit (GPU).

The communication section 12 has a function to communicate with the network NW by wired connection such as Ethernet (registered trademark) or radio communication such as WiFi (registered trademark). The input section 13 is integrated with a display as a touch panel, for example. The input section 13 receives various instructions entered by user manipulation. The input section 13 may be another type of input device such as a keyboard, a mouse, a touch pad, and/or a microphone.

The display section 15 is a display that displays information such as an image and/or a text. The display section 15 can be constituted by, e.g., a liquid crystal display panel or an organic electroluminescence (EL) display panel. The display section 15 may be separated from the user terminal 10. In this case, the display section 15 is connected with the user terminal 10 by wired connection or radio connection.

The storage section 14 stores therein various information, various images, and various programs (which may be a game control program) to be processed by the user terminal 10. The storage section 14 may be constituted by a hard disk drive (HDD), a solid state drive (SSD), an electrically erasable programmable read-only memory (EEPROM) (registered trademark), a read only memory (ROM), a random access memory (RAM), and/or the like. Note that the storage section 14 is not limited to the one integrated in the user terminal 10, and may alternatively be an external storage device connected by, e.g., a digital input-output port such as USB. The user terminal 10 may further include a hardware configuration such as a camera, a gyro sensor, and/or a global positioning system (GPS) reception module (each not illustrated).

The audio output section 16 outputs audio. The audio output section 16 may be constituted by, e.g., a speaker and/or an audio output terminal. The audio output section 16 may alternatively be the one that causes, via radio connection such as Bluetooth (registered trademark), an external earphone, headphone, or speaker to output audio.

(Hardware Configuration of Player Terminal 20)

Figure 3:
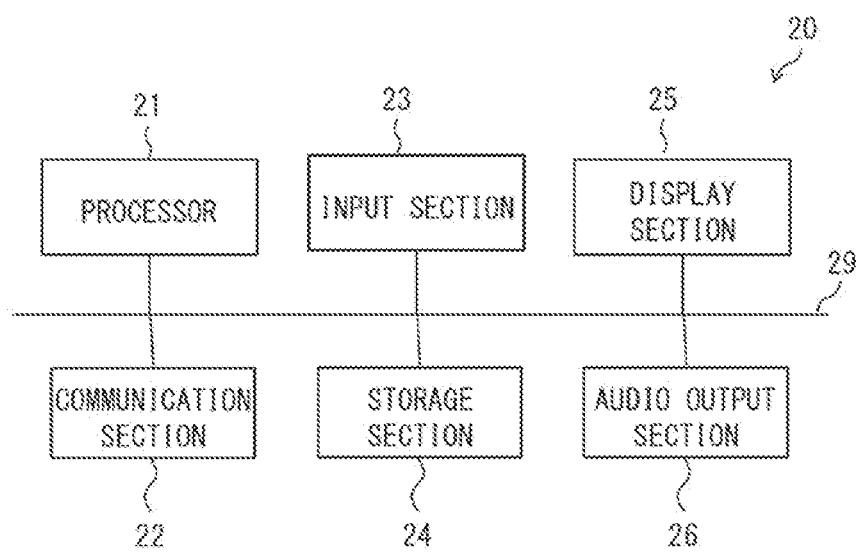
FIG. 3 is a view illustrating an example of a hardware configuration of a player terminal in accordance with Embodiment 1 of the present invention.

FIG. 3 is a view illustrating an example of a hardware configuration of the player terminal 20 in accordance with Embodiment 1. The player terminal 20 includes, for example, a processor 21, a communication section 22, an input section 23, a storage section 24, a display section 25, and an audio output section 26. The player terminal 20 communicates, via the communication section 22, with the game server 30, the video distribution server 40, another device, and the like that are connected with the player terminal 20 via the network NW. These elements are connected with each other via a bus 29 such that the elements can communicate with each other. Similarly to the processor 11, the processor 21 executes various programs stored in the storage section 24 to control each section in the player terminal 20.

The input section 23 may be, e.g., a controller such as a gamepad and/or a joystick, or may alternatively be another type of input device such as a touch panel, a keyboard, a mouse, a touch pad, and/or a microphone. The display section 25 is a display that displays information such as an image and/or a text. The display section 25 can be constituted by, e.g., a liquid crystal display panel or an organic electroluminescence (EL) display panel. The display section 25 may be separated from the player terminal 20. In this case, the display section 25 is connected with the player terminal 20 by wired connection or radio connection. The communication section 22, the storage section 24, and the audio output section 26 can have the same configurations as the communication section 12, the storage section 14, and the audio output section 16, respectively.

(Hardware Configuration of Game Server 30)

Figure 4:
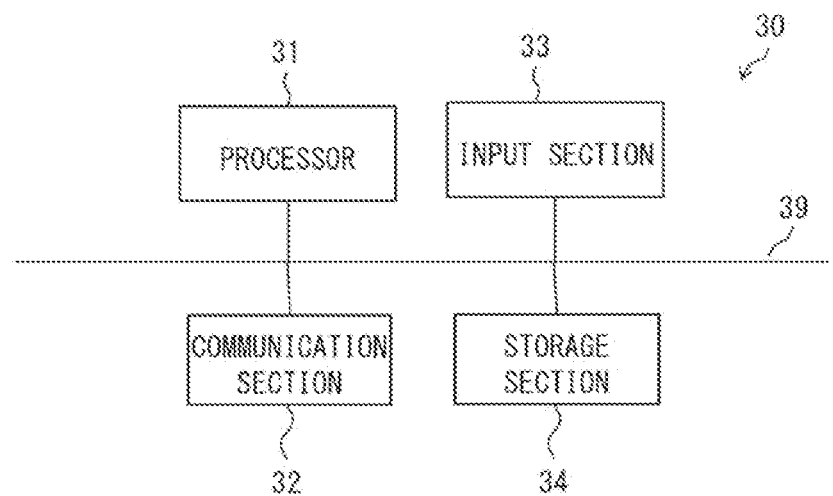
FIG. 4 is a view illustrating an example of a hardware configuration of a game server in accordance with Embodiment 1 of the present invention.

FIG. 4 is a view illustrating an example of a hardware configuration of the game server 30 in accordance with Embodiment 1. The game server 30 includes, for example, a processor 31, a communication section 32, an input section 33, and a storage section 34. The game server 30 communicates, via the communication section 32, with the plurality of user terminals 10, the player terminal 20, another device, and the like that are connected with the game server 30 via the network NW. These elements are connected with each other via a bus 39 such that the elements can communicate with each other. Similarly to the processor 11, the processor 31 executes various programs stored in the storage section 34 to control each section in the game server 30. The input section 33 may be, e.g., a keyboard and a mouse, and may alternatively be another type of input device such as a touch pad, a touch panel, and/or a microphone. The communication section 32 and the storage section 34 can have the same configurations as the communication section 12 and the storage section 14, respectively.

(Functional Configuration of User Terminal 10)

Figure 5:
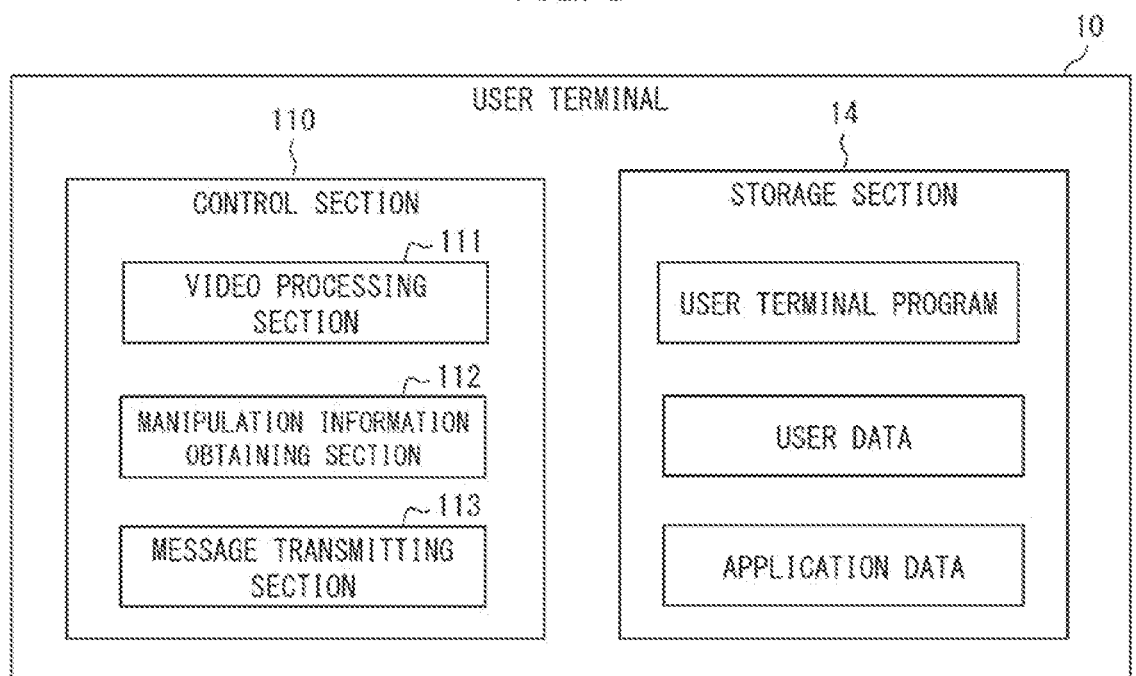
FIG. 5 is a view illustrating an example of a functional configuration of the user terminal in accordance with Embodiment 1 of the present invention.

FIG. 5 is a block diagram illustrating an example of a functional configuration of the user terminal 10 in accordance with Embodiment 1. FIG. 5 shows only a control section 110 and the storage section 14, and does not show the other parts of the configuration shown in FIG. 2. Note that the control section 110 has a functional configuration that can be achieved by the processor 11 executing a user terminal program stored in the storage section 14.

The user terminal 10 does not have a function to control progress of a game. That is, the control section 110 cannot control progress of the game.

The game refers to giving amusement to a player by a game application, which realizes a game, outputting a result to the player in response to player's input. The progress of the game refers to sequentially executing, in the game, a series of processes from the player's input to output of the result in response to the input. Controlling the progress of the game refers to controlling, by the game application realizing the game, the series of processes from the player's input to output of the result in response to the input. Not controlling the progress of the game refers to not carrying out these series of processes.

The series of processes may be, for example, a process for accepting manipulation for making the game progress, a process for controlling arrangement of an object(s) in a game space in accordance with manipulation for making the game progress, a process for calculating an in-game parameter in accordance with manipulation for making the game progress, a process for exchanging, with an external entity, information required to make the game progress, and/or a process for displaying an image indicating progress of the game.

The progress of the game may include giving an effect on a result, superiority or inferiority, or an achievement status of the game. In this case, controlling the progress of the game includes executing a process for giving an effect on the result, superiority or inferiority, or an achievement status of the game.

The result of the game refers to information indicating winning or losing of the game, information indicating a score, information indicating whether or not a goal set in the game is accomplished. The superiority or inferiority in the game refers to information indicating whether the possibility that a favorable result is obtained is high (superior) or low (inferior). The achievement status of the game may be information indicating a progress status until the goal in the game is accomplished.

The storage section 14 stores therein the user terminal program, user data, and application data. The application data is data to which the processor 11 that executes the user terminal program refers in order to execute various processes, and may include, e.g., image data of various objects to be displayed on the display section 15. The application data may be data to be displayed so as to allow a manipulation information obtaining section 112 (described later) to obtain manipulation information. The application data may alternatively be data to be updated by a device other than the user terminal, for example, by a game server. The user data is associated with a user, and includes a user ID with which the user can be identified.

The control section 110 includes a video processing section 111, the manipulation information obtaining section 112, and a message transmitting section 113 (one example of the transmitting section). The video processing section 111 reproduces, in the user terminal 10, video data distributed from the video distribution server 40. The manipulation information obtaining section 112 obtains, via a user interface displayed as a result of reference to the application data, manipulation information indicating manipulation carried out by the user with respect to the user terminal 10. In accordance with the manipulation information indicating the manipulation carried out by the user with respect to the user terminal 10, the message transmitting section 113 transmits, via the communication section 12, message information including at least a message.

(Functional Configuration of Player Terminal 20)

Figure 6:
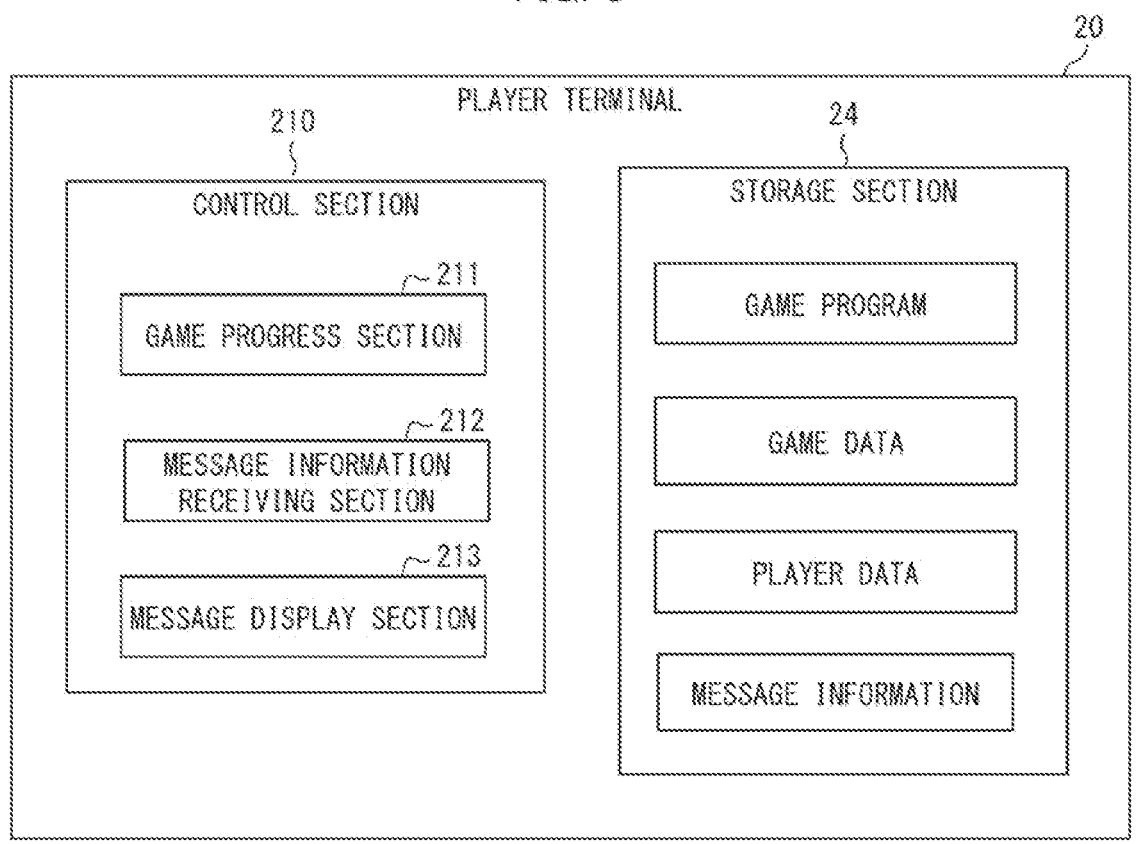
FIG. 6 is a view illustrating an example of a functional configuration of the player terminal in accordance with Embodiment 1 of the present invention.

FIG. 6 is a block diagram illustrating an example of a functional configuration of the player terminal 20 in accordance with Embodiment 1. FIG. 6 shows only a control section 210 and the storage section 24, and does not show the other parts of the configuration shown in FIG. 3. Note that the control section 210 has a functional configuration that can be achieved by the processor 21 executing a game program stored in the storage section 24.

The storage section 24 stores therein the game program, game data, player data, and message data. The game data is data to which the processor 21 that executes the game program refers in order to execute display or output of the game and a message, and may include, e.g., (i) model data and/or texture data of various objects such as an in-game player character and/or a background object and/or (ii) a sound source to be used in the game. The game data may be data for managing a progress status of the game. The player data is associated with the player, and includes, e.g., setting data indicating an environment setting of the game set by the player. The message data includes message information that is transmitted from the game server 30 to the player terminal 20 and that is displayed or output in the player terminal 20.

The control section 210 includes a game progress section 211, a message information receiving section 212 (one example of the receiving section), and a message display section 213. The player terminal 20 has a function to control the progress of the game, and the game progress section 211 controls the progress of the game. The message information receiving section 212 receives the message information from the game server 30. The message display section 213 displays a message in the game space in accordance with the message information received by the message information receiving section 212.

(Functional Configuration of Game Server 30)

Figure 7:
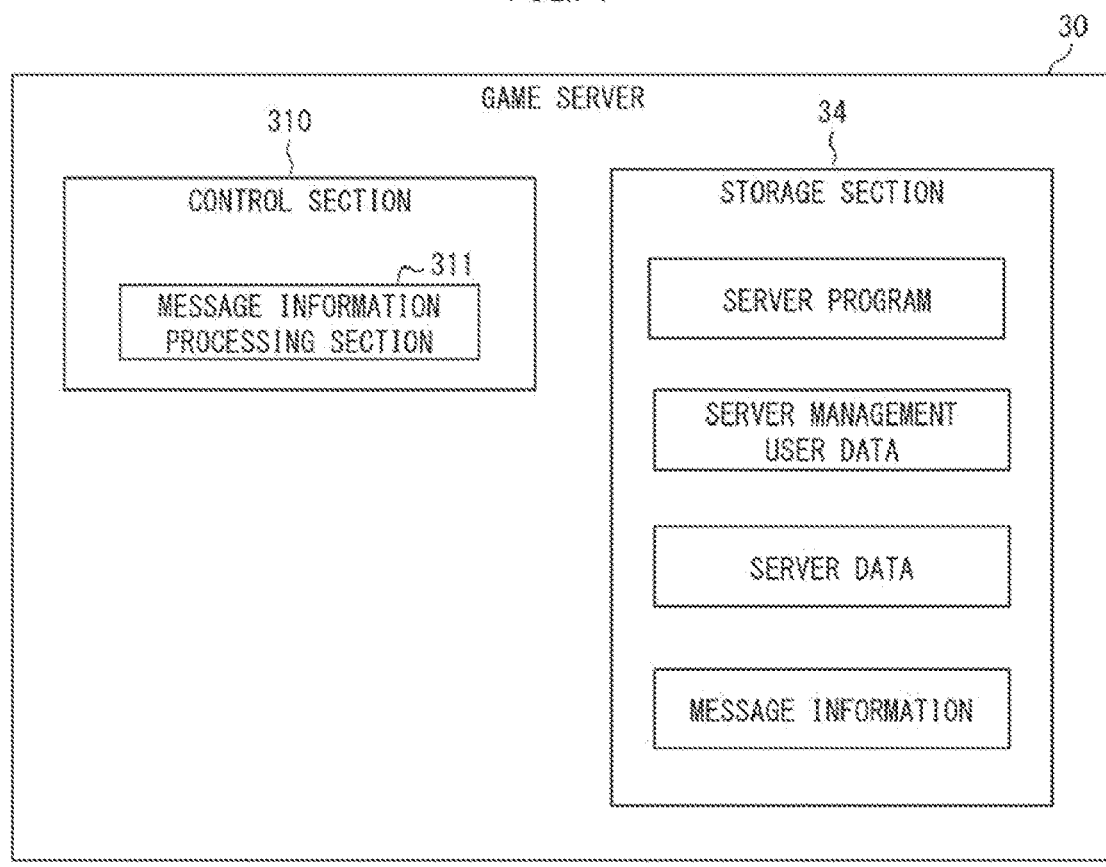
FIG. 7 is a view illustrating an example of a functional configuration of the game server in accordance with Embodiment 1 of the present invention.

FIG. 7 is a block diagram illustrating an example of a functional configuration of the game server 30 in accordance with Embodiment 1. FIG. 7 shows data stored in the storage section 34 and a control section 310, which has a functional configuration realized by the processor 31 executing a server program stored in the storage section 34, and does not show the other parts of the configuration illustrated in FIG. 4.

The storage section 34 stores therein the server program, server management user data, server data, and message data. In the storage section 34, pieces of server management user data are stored for respective users. The pieces of server management user data may include pieces of information indicating, e.g., user IDs, user names, and/or the numbers of possessed coins of the respective users. The server data is data to which the processor 31 that executes the server program refers in order to execute various processes, and may include, e.g., exposure degree setting data, consumed amount setting data, and/or output mode setting data, each of which will be described later. The message data includes pieces of message information transmitted from the user terminals 10 to the game server 30.

The control section 310 includes a message information processing section 311. The message information processing section 311 processes the message information received from the user terminal(s) 10.

The video distribution server 40 is a server having a function to (i) receive video data from the player terminal 20 or an external device connected to the player terminal 20 and (ii) immediately transmit the video data to the user terminals 10. The video distribution server 40 may have a configuration similar to that of a generally-used video distribution server. The game server 30 may also function as the video distribution server 40.

(Outline of Information Processing System 1)

The information processing system 1 provides a mechanism that allows the user terminal 10 not having a function to control progress of a game to transmit a message to the player terminal 20 that controls the progress of the game. In an aspect, a video indicating the progress of the game played in the player terminal 20 may be distributed to the user terminal 10. With this, while viewing the video, the user can transmit a message cheering on the player via the user terminal 10.

Note that the genre of the game is not limited to a particular genre. Examples of the game encompass games of various types and various genres such as sports games (games themed football, baseball, tennis, American football, basketball, volleyball, and the like), battle games, adventure games, simulation games, role-playing games, and caring games. The game may be a single-player game or a multi-player game. The following description will discuss, as an example, a case in which the game progressing in the player terminal 20 is a baseball game.

(Flow of Video Distribution Process)

Figure 8:
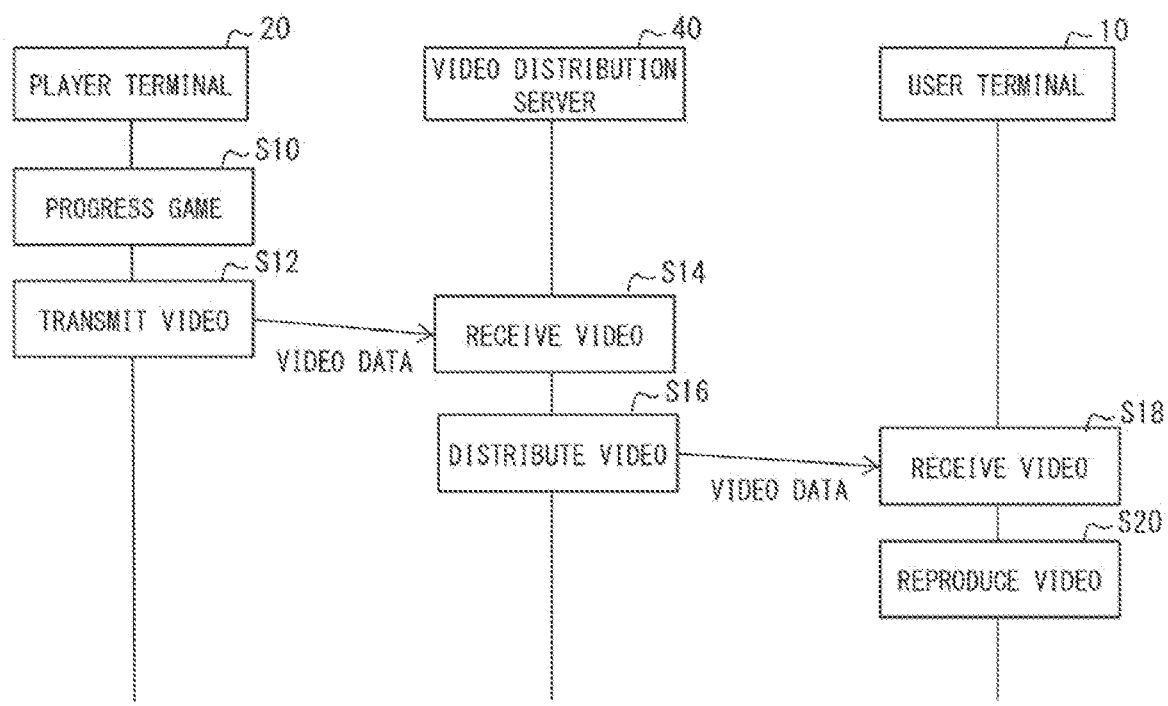
FIG. 8 is a flow diagram illustrating an example of a flow of a video distribution process to be carried out by the information processing system in accordance with Embodiment 1 of the present invention.

FIG. 8 is a flow diagram illustrating an example of a flow of a video distribution process to be carried out by the information processing system 1. As shown in FIG. 8, the information processing system 1 distributes, to the user terminals 10, a video presenting the game progressing in the player terminal 20.

First, in the player terminal 20, the game progress section 211 makes the game progress, and outputs a moving image signal and an audio signal to the display section 25 and the audio output section 26, respectively (step S10). The control section 210 encodes the moving image signal and audio signal into video data, and transmits the video data to the video distribution server 40 via the communication section 22 (step S12). Instead of the configuration in which the control section 210 carries out the encoding, another device connected to the player terminal 20 may capture the moving image signal and audio signal output from the player terminal 20, encode the moving image signal and audio signal into video data, and transmit the video data to the video distribution server 40.

The video distribution server 40 receives the video data from the player terminal 20 (step S14), and immediately distributes the video data to the user terminals 10 (step S16). In each of the user terminals 10, the video processing section 111 receives the video data from the video distribution server 40 via the communication section 12 (step S18), and reproduces the video data (step S20). In an aspect, the video processing section 111 decodes the video data so as to cause the display section 15 to display the moving image signal included in the video data and to cause the audio output section 16 to output the audio signal included in the video data.

Note that the information processing system 1 may not include the video distribution server 40, and may not distribute, to the user terminals 10, the video presenting the game progressing in the player terminal 20. In this case, for example, the user may use a video distribution system that is not the information processing system 1 to view the video presenting the game progressing in the player terminal 20. As described above, the information processing system 1 is a system providing a mechanism that allows the user terminal 10 not having the function to control the progress of the game to transmit a message to the player terminal 20 controlling the progress of the game, and does not necessarily have to execute the video distribution process.

(Flow of Message Transmitting Process)

Figure 9:
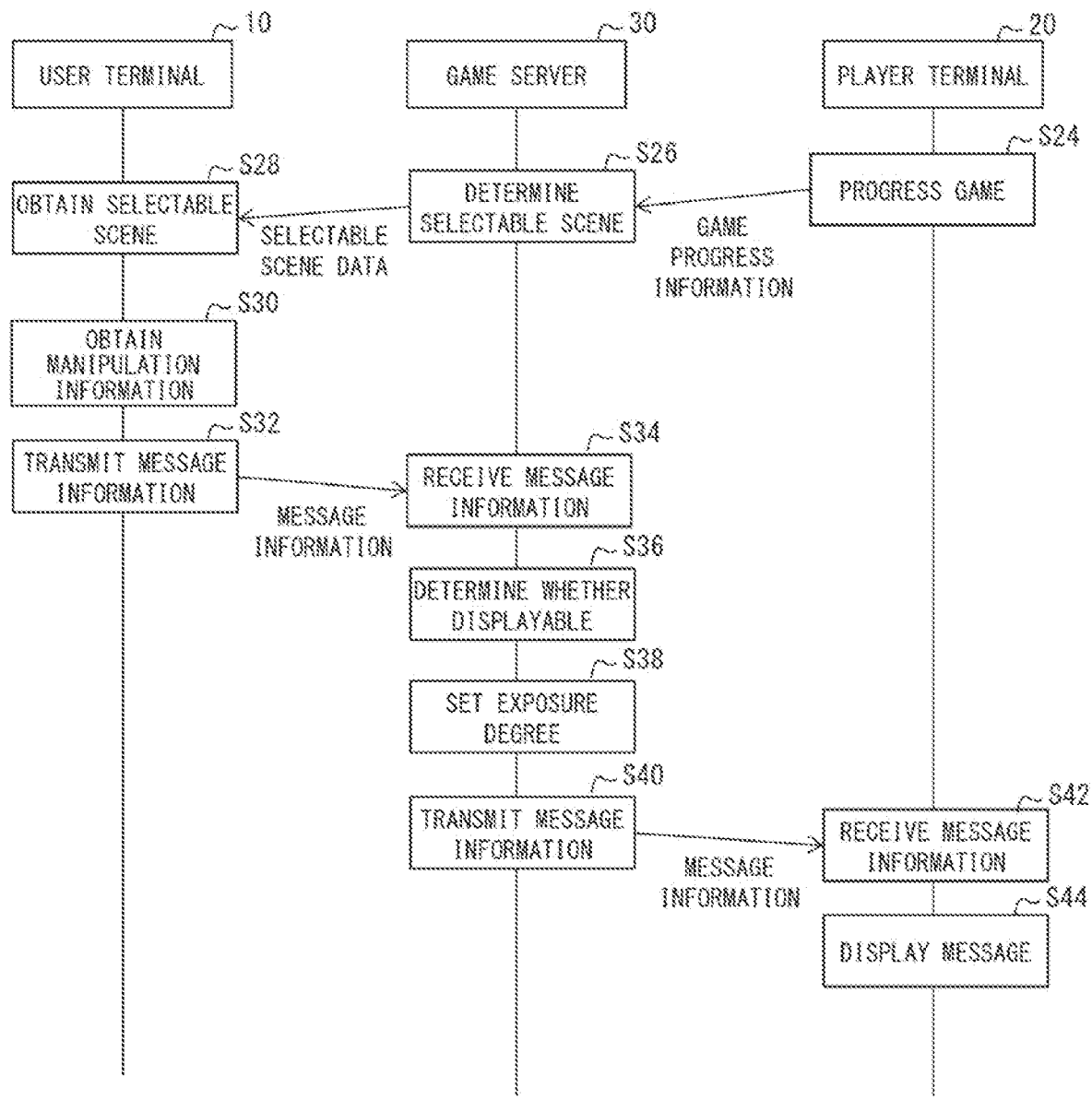
FIG. 9 is a flow diagram illustrating an example of a flow of a message transmitting process to be carried out by the information processing system in accordance with Embodiment 1 of the present invention.

FIG. 9 is a flow diagram illustrating an example of a flow of a message transmitting process to be carried out by the information processing system 1. As shown in FIG. 9, the information processing system 1 causes the player terminal 20 to display a message(s) transmitted from the user terminal(s) 10.

First, in the player terminal 20, the game progress section 211 makes the game progress, and updates game progress information included in the game data (step S24). The game progress information is information indicating a progress status of the game. The game progress section 211 transmits the game progress information to the game server 30 via the communication section 22.

In the game server 30, the message information processing section 311 generates selectable scene data in accordance with the game progress information received via the communication section 32 (step S26). The selectable scene data is data indicating an option(s) for a scene selectable, at the point of time, as a scene to display a message.

Figures 11, 12:
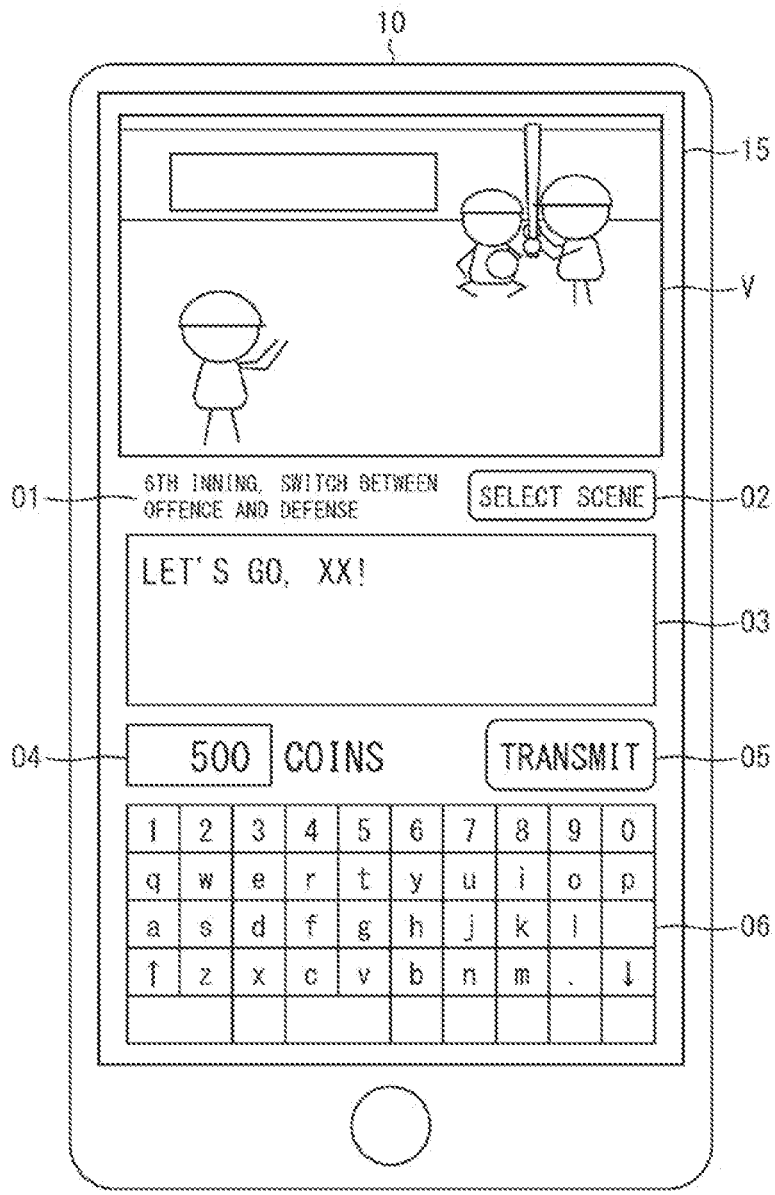
FIG. 11 is a view illustrating an example of a display image in the user terminal in accordance with Embodiment 1 of the present invention.
FIG. 12 is a table illustrating selectable scene data in accordance with Embodiment 1 of the present invention.

FIG. 12 is a view illustrating an example of the selectable scene data. As shown in FIG. 12, the selectable scene data includes an option(s) for a selectable display timing and an option(s) for a display position selectable when each display timing is selected. In this example, no display position is selectable when "6TH INNING, SWITCH BETWEEN OFFENCE AND DEFENSE" or "6TH INNING, END OF THE INNING" is selected, and options "FIRST-BASE BANNER", "THIRD-BASE BANNER", and "FENCE UNDER BACKSTOP NET" exist as options for the display position when "NO DESIGNATION (ANY TIME)" is selected. According to the selectable scene data in the example in FIG. 12, the display position becomes unselectable when a certain display timing is selected. Alternatively, the selectable scene data may be configured such that the display timing becomes unselectable when a certain display position is selected.

Note that, in the selectable scene data, an item that is unselectable may be an item that is determined in advance, for example. Taking the case shown in FIG. 12 as an example, in a case where the timing of "6TH INNING, SWITCH BETWEEN OFFENCE AND DEFENSE" or "6TH INNING, END OF THE INNING" is selected as the display timing, the centerfield screen may be determined in advance as the display position and the display position may become unselectable.

The message information processing section 311 refers to the game progress information to determine an option(s) for the display timing and an option(s) for the display position included in the selectable scene data. In an aspect, the message information processing section 311 may determine, as an option for the selectable display timing, a timing ahead of the game progress status indicated by the game progress information. Assume that progress of a baseball game is at the top of the 6th inning. In this case, the message information processing section 311 may determine, as an option for the selectable display timing, "6TH INNING, SWITCH BETWEEN OFFENCE AND DEFENSE" and "6TH INNING, END OF THE INNING". The message information processing section 311 may determine, as an option for the selectable display timing, "NO DESIGNATION (ANY TIME)" that is selectable regardless of the progress of the game. The message information processing section 311 transmits the selectable scene data to the user terminals 10 via the communication section 32.

In each of the user terminals 10, the manipulation information obtaining section 112 obtains the selectable scene data via the communication section 12, and stores the selectable scene data as application data in the storage section 14 (step S28).

Then, the manipulation information obtaining section 112 obtains manipulation information indicating manipulation carried out by the user with respect to the each of the user terminal 10 via the input section 13 (step S30), and the message transmitting section 113 transmits message information to the game server 30 in accordance with the manipulation information (step S32).

The message information transmitted in step S32 includes at least (i) a message and (ii) information indicating a scene which is included in a game space where the game progresses and in which the message is to be displayed. That is, in accordance with the manipulation carried out by the user with respect to the each of the user terminals 10, the message transmitting section 113 transmits the message information including at least (i) the message and (ii) the information indicating the scene which is included in the game space where the game progresses and in which the message is to be displayed.

The game space refers to a virtual space where the game progresses, and may be a three-dimensional space or a two-dimensional space. The game space may include, for example, (i) a space where various objects appearing in the game, such as an in-game player character and/or a background object, can move or can be arranged, (ii) a region dedicated for display of a message in the game, and/or (iii) a region dedicated for display of a UI object. Note that, in an aspect, the message included in the message information transmitted from the user terminal 10 may be set to be displayed in the space where the various objects can move or can be arranged, and may not to be displayed in the region dedicated for display of the message in the game, the region dedicated for display of the UI object, or the like.

The scene refers to a subject in the game which subject is defined by either or both of a timing in the progress of the game and a position in the game space.

The timing in the progress of the game refers to a timing specified in accordance with the progress of the game, and may be a point of time at which a condition concerning the progress of the game is satisfied, for example. The condition may be, for example, a condition that offense and defense are switched at a certain inning in the progress of a baseball game, a condition that a certain in-game player stands on a batter's box, or a condition that half-time starts in the progress of a football game. For another example, the condition may be a condition satisfied depending on player manipulation, e.g., a condition that a certain team hits a home run in the progress of a baseball game or a condition that a distance between a certain in-game player and a goal becomes equal to or shorter than a threshold in the progress of a football game.

The position in the game space refers to a position specified in the game space, and may be a fixed position or a varied position, for example. The fixed position may be represented by certain coordinates in a coordinate system representing the game space or may be represented as a position of a certain object statically arranged in the game space. Examples of the fixed position encompass a fence under a backstop net, a banner in spectator seats, a signboard at a fence, and a centerfield screen. The varied position may be represented by over-time changes in certain coordinates in the coordinate system representing the game space or may be represented as a position of a certain object movably arranged in the game space. Examples of the varied position encompass a position of a uniform worn by an in-game player character moving in a stadium and a position of an airship moving in air. In a case where it is indicated that the position to display the message is a position of a certain object, the message is displayed on the certain object.

The message information transmitted in step S32 may further include information indicating a consumed amount of a consumption value possessed by the user which consumed amount is associated with the message. The consumed amount associated with the message refers to an amount of the consumption value that is to be consumed in exchange for display of the message in the player terminal 20.

The consumption value is a value that is to be consumed in exchange for an object or a service provided to the user. For example, the consumption value may be represented by information (in-game currency) exchangeable with an item or a service in a certain game, information (virtual currency other than in-game currency) exchangeable with an item or a service not related to a certain game, or an amount of money associated with a bank account, a credit card, a cashless payment service, or the like.

Figure 10:
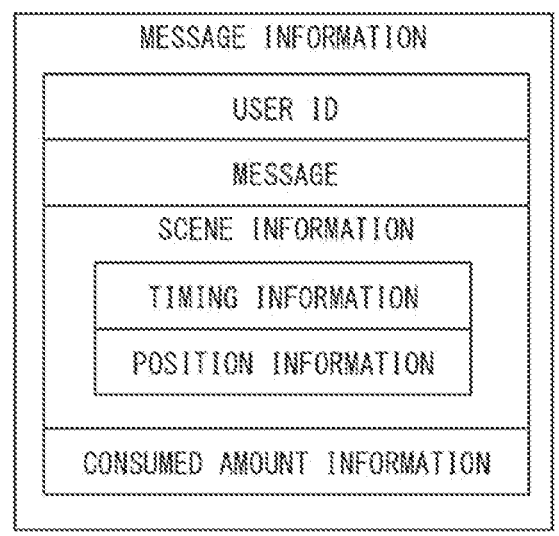
FIG. 10 is a view illustrating an example of a data structure of message information in accordance with Embodiment 1 of the present invention.

FIG. 10 illustrates an example of a data structure of message information. The message information includes a user ID, which is an identifier for identifying the user, a message, scene information, and consumed amount information. The scene information is information indicating a scene which is included in the game space and in which a message is to be displayed. The scene information includes timing information indicating a certain timing in the progress of the game and position information indicating a certain position in the game space. The consumed amount information is information indicating a consumed amount of the consumption value possessed by the user, and is associated with a message. In Embodiment 1, the data structure of the message information is not limited to this. The message information may not include a part of the above-described pieces of information or may further include additional information. Particularly, the scene information may not include both the timing information and the position information, and may alternatively include only either of the timing information and the position information.

Figures 13, 14:
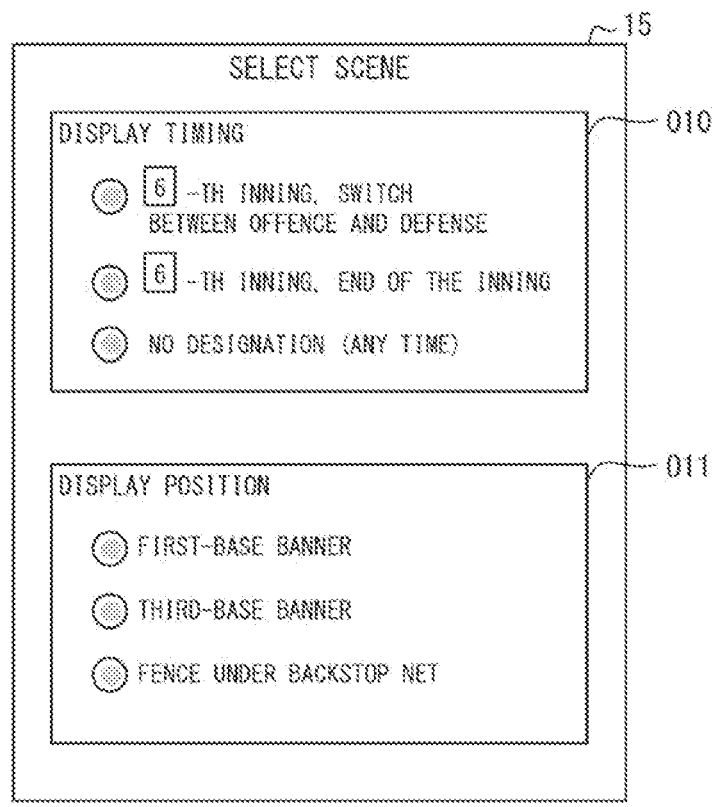
FIG. 13 is a view illustrating an example of a display image in the user terminal in accordance with Embodiment 1 of the present invention.
FIG. 14 is a table illustrating an example of a part of server management user data in accordance with Embodiment 1 of the present invention.

The manipulation information obtaining section 112 refers to the selectable scene data obtained in step S28 to cause the display section 15 to display UI such as the one shown in FIG. 11 or 13, thereby obtaining manipulation information. In accordance with the manipulation information, the message transmitting section 113 transmits such message information.

FIG. 11 is a view illustrating an example of a display image in the user terminal 10. As shown in FIG. 11, the display section 15 displays (i) a moving image V of game play obtained by reproducing the video data transmitted from the player terminal 20, (ii) an object O2 used to select a scene to display a message, (iii) an object O1 indicating the selected scene, (iv) an object O6 used to enter a message, (v) an object O3 indicating the entered message, (vi) an object O4 used to enter a consumed amount, and (vii) an object O5 used to transmit message information.

Note that each of the user terminals 10 may display the moving image V of the game play by an application different from the application used to transmit the message information. For example, each of the user terminals 10 may display the moving image V of the game play by a general browser, another application for SNS, or the like. Each of the user terminals 10 may not display the moving image V of the game play. In this case, the user may use another terminal to view the moving image V of the game play.

When the manipulation information obtaining section 112 detects manipulation of selecting the object O2 via the input section 13, the manipulation information obtaining section 112 refers to the selectable scene data obtained in step S28 to switch a display image on the display section 15 to, e.g., the one shown in FIG. 13. As shown in FIG. 13, the display section 15 displays an object O10 used to select a timing and an object O11 to select a position.

The object O10 includes, for example, an option for selecting a timing of switch between offence and defense in any inning, an option for selecting a timing of end of any inning, and an option for selecting not to designate a certain timing in the progress of the game. A user can enter information to the area "-TH INNING" in each option. In a case where a certain timing in the progress of the game is not designated, a timing to display the message is a timing immediately after transmission of the message information. The object O10 may include, instead of or in addition to the options shown in FIG. 13, other option(s) such as an option for selecting a timing satisfying a given condition in the progress of the game, examples of which encompass an option for selecting a timing at which a certain in-game player stands on a batter's box and an option for selecting a timing at which a certain team hits a home run.

The object O11 includes, for example, an option for selecting a first-base banner, an option for selecting a third-base banner, and an option for selecting a fence under a backstop net. The object O10 may include, instead of or in addition to the options shown in FIG. 13, other option(s) such as options for selecting a signboard at a first-base side fence, a signboard at a third-base side fence, a centerfield screen, a uniform of an in-game player's uniform, and an airship appearing in the game space.

The manipulation information obtaining section 112 grays out, in the object O10 or O11, an item(s) that is set as unselectable in the selectable scene data so as to make the item(s) unselectable. For example, the selectable scene data shown in FIG. 12 indicates that the display position is unselectable when "X-TH INNING, SWITCH BETWEEN OFFENCE AND DEFENSE" or "X-TH INNING, END OF THE INNING" is selected as the display timing. Thus, when a timing of switch between offence and defense in any inning or a timing of end of any inning is selected in the object O10, the manipulation information obtaining section 112 grays out the object O11 so as to make it unselectable.

The manipulation information obtaining section 112 obtains, via the input section 13, a value entered to the object O4 and a character string entered to the object O6.

Then, the message transmitting section 113 transmits, via the communication section 12, message information generated by obtaining a user ID in the user data from, e.g., the storage section 14, determining a message in accordance with a character string entered to the object O3, determining timing information in accordance with an option selected in the object O10, determining position information in accordance with an option selected in the object O11, determining timing information in accordance with an option selected in the object O10, and determining consumed amount information in accordance with a value entered to the object O4.

Note that the manipulation information obtaining section 112 may cause the display section 15 to display, as an object used to enter a message, an object via which image data such as a stamp can be entered. The message transmitting section 113 may determine a message in accordance with the image data entered to the object.

The message transmitting section 113 may determine a timing to display a message in accordance with the progress of the game, not in accordance with the manipulation information. For example, in a case where the 6th inning ends in the progress of the game, a timing of switch between offence and defense in the 7th inning may be determined as the timing information.

The communication section 32 of the game server 30 receives the message information transmitted from each of the user terminals 10 (step S34), and the message information processing section 311 starts a process on the message information.

The message information processing section 311 first determines whether or not the message information is displayable from some points of view (step S36).

FIG. 14 is a table illustrating an example of a part of the server management user data stored in the storage section 34. As shown in FIG. 14, the server management user data includes a user ID, a user name, and the number of possessed coins indicating a consumption value possessed by the user. The user name and the number of possessed coins are associated with the user ID. If the number of possessed coins associated with the user ID included in the received message information is smaller than a consumed amount indicated by the consumed amount information included in the message information, the message information processing section 311 determines that the message information is not displayable.

The message information processing section 311 further determines whether or not the message in the received message information includes an expression inappropriate to display (so-called NG word). If the message information includes an inappropriate expression, the message information processing section 311 determines that the message information is not displayable or converts the expression into another character string.

There may be a case where pieces of message information that the game server 30 has received from the plurality of user terminals 10 indicate the same scene to display a message. In such a case, the game server 30 may preferentially process a message received earlier. In an aspect, the message information processing section 311 may determine that it is impossible to display a piece of message information including information indicating a scene identical to that of a piece of message information having been already received (except for a piece of message information determined not to be displayable). In order to prevent a situation in which the user terminals 10 transmit pieces of message information indicating the same scene to display a message, the message information processing section 311 may notify, via the communication section 32, the user terminals 10 of received information indicating a scene of information having been already received. Upon reception of the received information, the user terminals 10 may gray out, in step S30, an option for selecting the scene indicated by the received information so as to make the scene unselectable.

If the message information processing section 311 determines that the received message information is displayable, the message information processing section 311 reduces the number of user's possessed coins in the server management user data by a number indicated by the consumed amount information included in the message information, and continues the process on the message information. Meanwhile, if the message information processing section 311 determines that the received message information is not displayable, the message information processing section 311 may stop the process on the message information and may transmit, to the user terminals 10, a message indicating that the message information is not displayable.

Then, the message information processing section 311 sets an exposure degree associated with the message information determined as displayable (step S38).

The exposure degree refers to an indicator that indicates a degree of ease of recognition of an object used in the game. For example, the exposure degree may be an indicator indicating a degree of ease of recognition of a display element corresponding to the object on the screen or an indicator indicating a degree of ease of recognition of the object in the game space. Here, the object refers to an object in which the message included in the message information can be displayed. Examples of the object encompass a signboard, a centerfield screen, a uniform worn by an in-game player character, a banner, and an airship.

For example, in a case where the exposure degree indicates a degree of ease of recognition of a display element on the screen, the exposure degree may indicate a display period of the display element or a display mode of the display element. Alternatively, the exposure degree may indicate both the display period and the display mode of the display element.

The display period refers to a period in which the display element is displayed on the screen. Here, the display element refers to the message included in the message information. For example, a period in which the message is displayed is determined in accordance with the progress of the game or independently of the progress of the game. Here, (i) the display period determined in accordance with the progress of the game refers to a length of period from a certain timing to another timing that corresponds to the progress of the game, and may be, for example, a period from the start of the 6th inning to the end of the 6th inning. Meanwhile, (ii) the display period determined independently of the progress of the game is expressed as a length of a real time period, and may be, for example, five minutes. The period in which the message is displayed may be determined by a combination of (i) with (ii), and may be one minute from the start of the 6th inning, for example. A longer display period means a higher exposure degree.

The display mode refers to a mode in which the display element is displayed on the screen. Here, the display element refers to the message included in the message information. The display mode of the message is determined by the size, orientation, color, font, and/or animation of the message, for example.

For another example, the display mode of the message may be adjusted by the position, orientation, viewing angle, and/or the like of a virtual camera. That is, as one method for adjusting the display mode of the message, a focus of the virtual camera with respect to the message displayed in the game space may be adjusted.

Even in a case where the message is displayed in the game space of the game progressing in the player terminal 20, the following case may happen. That is, depending on the position, orientation, and/or viewing angle of the virtual camera, the message is not displayed in the display section 25 or, even if the message is displayed, the message is not recognized by the player since the message is displayed in the far distance. Thus, the position, orientation, viewing angle, and/or the like of the virtual camera are adjusted so that the object indicating the message to be recognized by the player is displayed to have a certain degree of area in the game image.

In an aspect, adjustment such as getting the virtual camera closer to the display position of the message in the game space, reducing the viewing angle of the virtual camera (zoom-in), and/or adjusting the position and orientation of the virtual camera so as to face the position of the message in the game space is carried out. Herein, the focus means a degree of such adjustment of the virtual camera. A higher focus increases means a high degree of the adjustment. Also, a higher focus means a higher exposure degree.

In Embodiment 1, in accordance with the consumed amount information included in the message information, the message information processing section 311 sets the display period and focus according to which the message is to be displayed. As the consumed amount indicated by the consumed amount information included in the message information increases, the message information processing section 311 sets a longer display period and a higher focus for displaying the message. In an aspect, the message information processing section 311 may set either of the display period and the focus.

Figures 15, 16, 17:
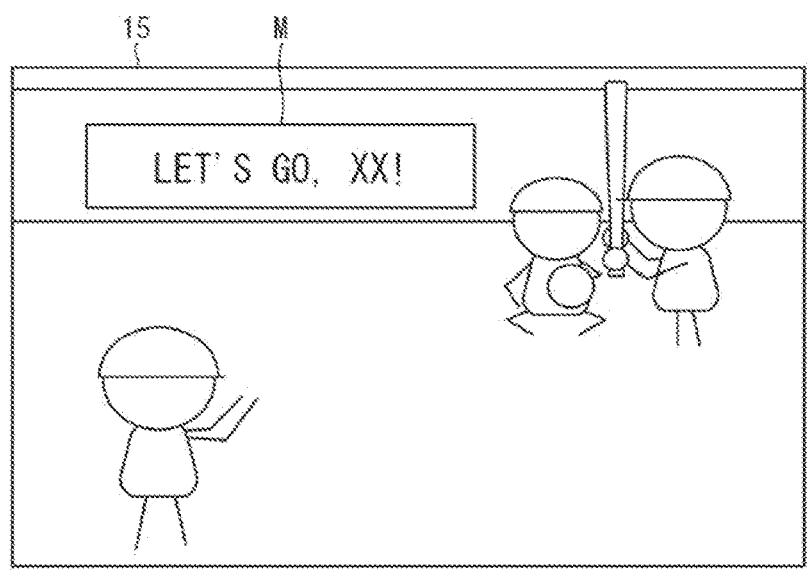
FIG. 15 is a table illustrating an example of exposure degree setting data in accordance with Embodiment 1 of the present invention.
FIG. 16 is a view illustrating an example of message information to be transmitted from the game server to the player terminal in Embodiment 1 of the present invention.
FIG. 17 is a view illustrating an example of display of a message in accordance with message information in Embodiment 1 of the present invention.

FIG. 15 is a table illustrating the exposure degree setting data included in the server data. As shown in FIG. 15, the exposure degree setting data includes a range of a consumed amount, a display period, and a focus. The display period and focus are associated with the range of the consumed amount. In an aspect, the message information processing section 311 may refer to the exposure degree setting data to set the display period and focus associated with the message information in accordance with the consumed amount information included in the message information.

In another aspect, the message information processing section 311 may set the display period and focus associated with the message information, with use of a formula defining a relation between (i) the consumed amount and (ii) the display period and focus and in accordance with the consumed amount information included in the message information.

Then, the message information processing section 311 transmits, to the player terminal 20, the message information for which the display period and focus are set (step S40).

FIG. 16 is a view illustrating an example of the message information to be transmitted from the game server 30 to the player terminal 20. The message information processing section 311 gives an identifier (command ID) to each piece of message information. The message information processing section 311 refers to the server management user data to obtain the user name corresponding to the user ID included in the message information. The message information processing section 311 transmits, to the player terminal 20 via the communication section 32, (i) the obtained user name and (ii) the display period and focus set in step S38 in association with the message information. Note that, as shown in FIG. 16, the message information transmitted from the game server 30 to the player terminal 20 may not include the user ID or the consumed amount information. Alternatively, the message information transmitted from the game server 30 to the player terminal 20 may include these pieces of information.

The message information receiving section 212 of the player terminal 20 receives, via the communication section 22, the message information from the game server 30, and accumulates the message information in the storage section 24 (step S42). The message display section 213 processes, as necessary, the message information accumulated in the storage section 24 to display the message (step S44). The message is displayed on the display section 25, and is also displayed on the display sections 15 of the user terminals 10 after being transmitted via the video distribution server 40. In an aspect, in accordance with the message information, the message display section 213 causes display of the message in a scene indicated by the information included in the message information.

In a case where the position information included in the message information indicates a certain object in the game space, the message display section 213 sets, as a texture of the certain object, an image including a character string of the message, and depicts the game space. With this, the message display section 213 can display the message in the position indicated by the position information. In a case where the position information included in the message information indicates certain coordinates in the game space, the message display section 213 positions, at a location defined by the certain coordinates, the object for which the image including the character string of the message is set as a texture, and depicts the game space. With this, the message display section 213 can display the message at the position indicated by the position information. In a case where the position information is not included in the message information or the position information included in the message information does not designate a certain position, the message display section 213 may display the message in a predetermined certain object or at predetermined certain coordinates.

In a case where the timing information included in the message information indicates a certain timing, the message display section 213 starts displaying the message when the certain timing comes. In a case where the timing information is not included in the message information or the timing information included in the message information does not designate a certain timing, the message display section 213 may start displaying the message immediately after receiving the message information.

The message display section 213 displays the message for the display period associated with the message information. In a case where the message information is not associated with the display period, the message display section 213 may display the message for a period corresponding to the timing information. For example, in a case where the timing information indicates the timing of switch between offence and defense in the 6th inning, the message display section 213 may display the message for a period from the end of the top of the 6th inning to the start of the bottom of the 6th inning.

FIG. 17 is a view illustrating an example of display of a message M in accordance with message information including "0001" as a command ID shown in FIG. 16. As shown in FIG. 16, the message information including "0001" as the command ID includes "LET'S GO, XX!" as a message, "NO DESIGNATION" as a display timing, "FENCE UNDER BACKSTOP NET" as a display position, "5 MIN." as a display period, and "5" as a focus. The message display section 213 refers to the display position and message in the message information to indicate the message M "LET'S GO, XX!" in the fence under the backstop net in the game space in the manner shown in FIG. 17. The message display section 213 also refers to the display timing and display period in the message information to start displaying the message M immediately after the player terminal 20 receives the message information, and continues displaying the message M for five minutes. The message display section 213 may also refer to the focus in the message information to adjust the orientation of the virtual camera so as to avoid partial cut-off of the message M.

Figures 18, 19:
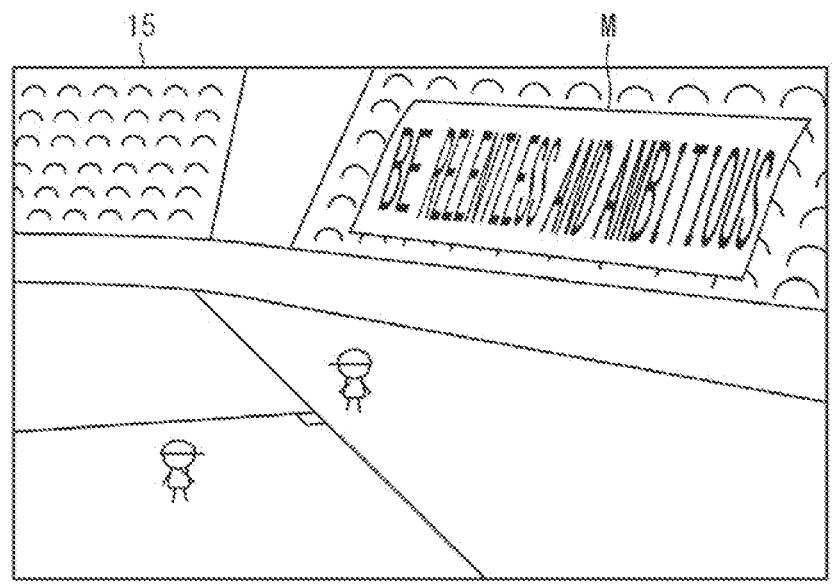
FIG. 18 is a view illustrating an example of display of a message in accordance with message information in Embodiment 1 of the present invention.
FIG. 19 is a table illustrating an example of consumed amount setting data in accordance with Embodiment 1 of the present invention.

FIG. 18 is a view illustrating an example of display of a message M in accordance with message information including "0002" as a command ID shown in FIG. 16. As shown in FIG. 16, the message information including "0002" as the command ID includes "BE RELENTLESS AND AMBITIOUS" as a message, "6TH INNING, SWITCH BETWEEN OFFENCE AND DEFENSE" as a display timing, "FIRST-BASE BANNER" as a display position, and "2" as a focus. The message display section 213 refers to the display position and message in the message information to display the message M "BE RELENTLESS AND AMBITIOUS" in the first-base banner in the game space in the manner shown in FIG. 18. The message display section 213 also refers to the display timing in the message information to start displaying the message M at a timing when the top of the 6th inning is ended, and continues to display the message M until the bottom of the 6th inning starts. The message display section 213 may also refer to the focus in the message information to adjust the position of the virtual camera so that the message M is entirely displayed.

As described above, adjustment can be carried out in the following manner. That is, in a case where the message is to be displayed in a large object, such as a banner, the message display section 213 may position the virtual camera at a location far from the object. Meanwhile, in a case where the message is to be displayed in a small object, the message display section 213 may position the virtual camera at a location close to the object. The message display section 213 may adjust the viewing angle, rather than adjusting the position of the camera. In order to improve visibility of the character string of the message, the message display section 213 may adjust the orientation of the virtual camera so that the virtual camera is oriented orthogonally to an object plane in which the message is displayed.

The message display section 213 does not have to continuously carry out the adjustment of the virtual camera throughout a period in which the message is displayed, but may carry out the adjustment only in a part of the period. If such adjustment of the virtual camera is carried out during a period in which manipulation for pitching, hitting, or the like is carried out (during play), this may possibly hinder player's game-playing. Therefore, it is preferable that the message display section 213 carry out the adjustment of the virtual camera at a timing not during manipulation. The timing not during manipulation may be, for example, a timing of presentation of a character rejoicing just after home-run or a timing of display of a replay moving image. In a case where the game is a football game, the timing not during manipulation may be a timing during half time, for example.

Effects of Embodiment 1

As described above, the information processing system 1 in accordance with Embodiment 1 includes: the player terminal 20 that controls progress of a game; and the user terminal 10 that is communicably connected with the player terminal 20 and that does not have a function to control progress of the game, the user terminal 10 including the message transmitting section 113 that transmits, in accordance with manipulation carried out by a user with respect to the user terminal 10, message information including at least (i) a message and (ii) information indicating a scene which is included in a game space where the game progresses and in which the message is to be displayed, the player terminal 20 including the message information receiving section 212 that receives the message information and the message display section 213 that displays the message in the scene in accordance with the message information.

The player is concentrated on playing the game. Therefore, if a message entered by the user of the user terminal 10 is displayed at a location outside the game space, the player hardly notices the message. According to Embodiment 1, the message is displayed in the game space, which allows the player to easily recognize the message. The game may include a scene in which a message is noticeable and a scene in which a message is not noticeable. The user of the user terminal 10 can designate a scene to display user's entered message, in order to make the message be recognized by the player. With this, the user of the user terminal 10 can cheer on the player effectively.

In an aspect, in accordance with the manipulation with respect to the user terminal 10, the message transmitting section 113 incorporates, into the message information, consumed amount information indicating a consumed amount of a consumption value possessed by the user which consumed amount is associated with the message. Further, the message display section 313 displays, in a scene indicated by the information included in the message information, the message at a higher exposure degree as the consumed amount increases.

With this, a message given by manipulation of a user who has consumed more consumption value achieves a higher exposure degree. This makes it possible to preferentially treat the user who has consumed more consumption value. In addition, this allows the user to select the exposure degree of the message by the consumed amount.

In an aspect, the information indicating the scene includes timing information indicating a certain timing in the progress of the game, and the message display section 313 displays the message at the certain timing.

With this, the user can designate a timing to display a message. A message may give a different impression to the player depending on the timing to display the message. With the above configuration, the user can designate a timing that the user considers suitable to display the message.

In an aspect, the information indicating the scene includes the position information indicating a certain position in the game space, and the message display section 313 displays the message at the certain position.

With this, the user can designate a position to display a message. A message may give a different impression to the player depending on the position to display the message. With the above configuration, the user can designate a position that the user considers suitable to display the message.

Variations
(Consumed amount in accordance with scene)
In an aspect, a consumed amount of a consumption value associated with a message may be determined in accordance with a scene to display the message.

FIG. 19 is a table illustrating an example of consumed amount setting data included in the server data. The consumed amount setting data includes a plurality of scenes. Each of the scenes is associated with a consumed amount set to be consumed in exchange for display of a message in the each of the scenes.

Figure 20:
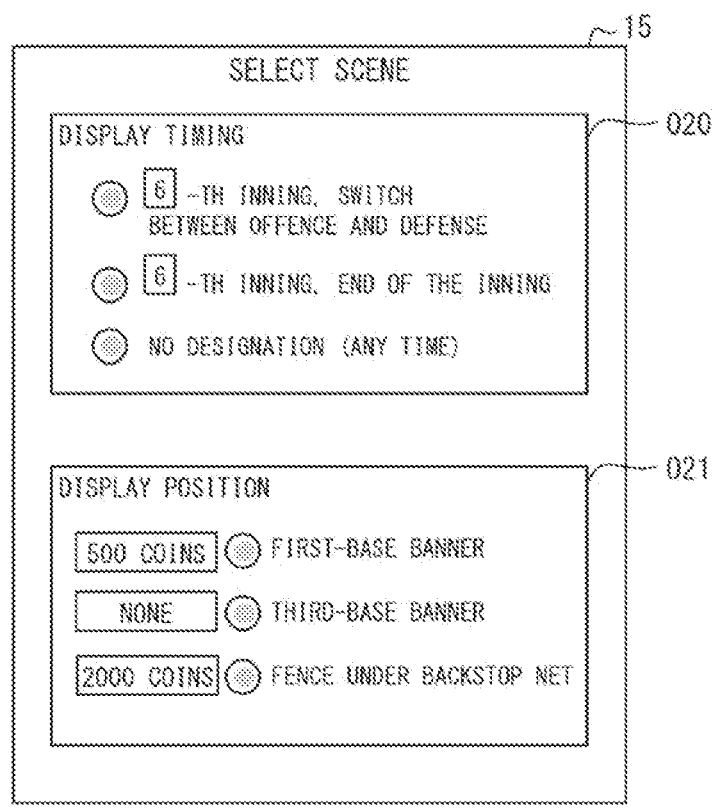
FIG. 20 is a view illustrating a variation of a display image in the user terminal in accordance with Embodiment 1 of the present invention.

In step S30, when the manipulation information obtaining section 112 detects, via the input section 13, manipulation of selecting the object O2 used to select the scene to display the message, the manipulation information obtaining section 112 switches the display image on the display section 15 to the one such as that shown in FIG. 20. As shown in FIG. 20, the display section 15 displays an object O20 used to select a timing and an object O21 to select a position.

The manipulation information obtaining section 112 obtains consumed amount setting data from the game server 30 via the communication section 12. The manipulation information obtaining section 112 refers to the consumed amount setting data to display a consumed amount required to display a message in a scene indicated by each option in the object O21 in such a manner that the required consumed amount is associated with the each option. In the example shown in FIG. 20, a consumed amount required to display a message in the first-base banner is 500 coins, a consumed amount required to display the message in the third-base banner 0 coin, and a consumed amount required to display the message in the fence under backstop net is 2000 coins.

In the examples shown in FIGS. 19 and 20, a position to display a message is associated with a consumed amount. Alternatively, a timing to display a message may be associated with a consumed amount. Further alternatively, both a position and a timing to display a message may be associated with a consumed amount.

In step S32, the message transmitting section 113 refers to the consumed amount setting data to determine the consumed amount information in accordance with a scene indicated by an option selected in the object O21.

As described above, in an aspect, the scene information indicates any of a plurality of scenes. Each of the scenes is associated with a consumed amount of the consumption value possessed by the user, the consumed amount being set, for the each of the scenes, to be consumed in exchange for display of a message in the each of the scenes.

With this, in a case where ease of recognition of a message varies depending on the scene, a consumed amount corresponding to the ease of the recognition can be set for each scene.

(Plurality of Player Terminals 20)
There is no particular limitation on the number of player terminals 20 included in the information processing system 1. For example, in a case where the game progressing in the player terminal 20 is a competitive game, multiple players may play the competitive game with a single player terminal 20 or may play the competitive game with their respective player terminals 20 connected to each other via the network NW.

Figure 21:
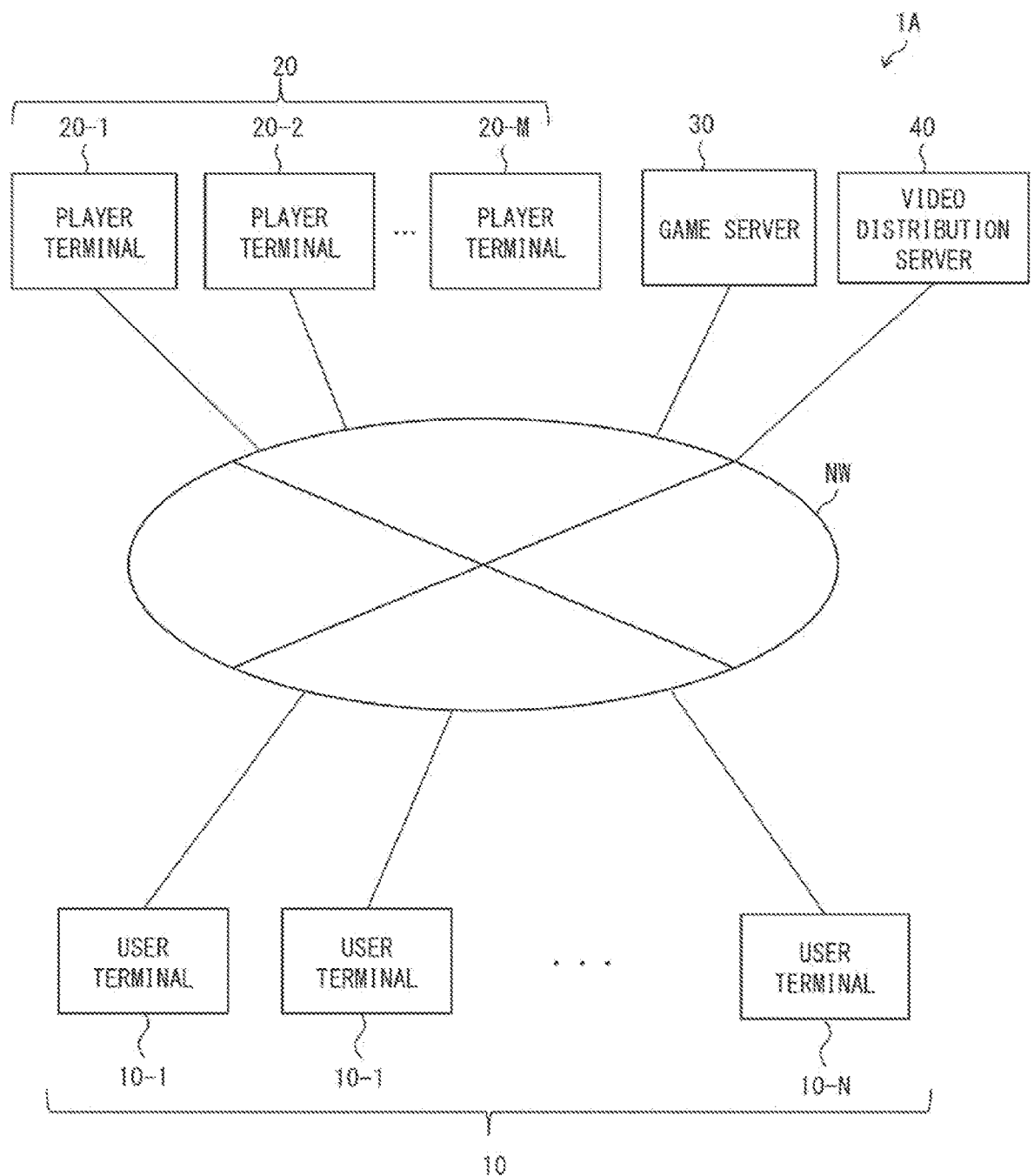
FIG. 21 is a block diagram illustrating a configuration of an information processing system in accordance with a variation of Embodiment 1 of the present invention.
Figure 22:
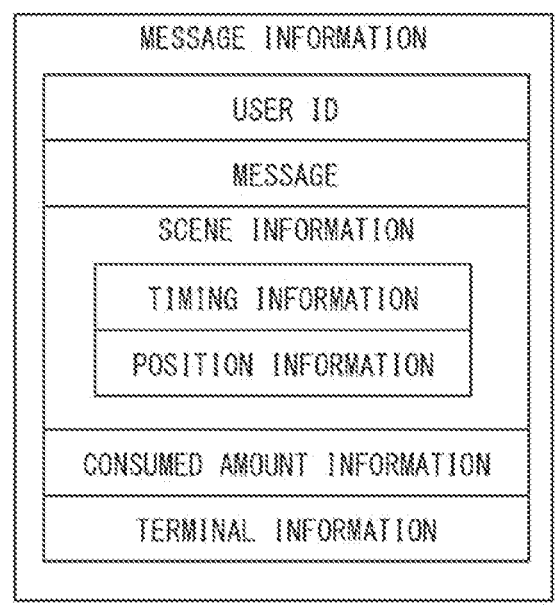
FIG. 22 is a view illustrating a data structure of message information in accordance with a variation of Embodiment 1 of the present invention.

FIG. 21 is a block diagram illustrating a configuration of an information processing system 1A in accordance with a variation. As shown in FIG. 21, the information processing system 1A includes M player terminals 20-1 to 20-M. A video distribution server 40 receives video data from any of the player terminals 20, and distributes the video data to user terminals 10.

In an aspect, in step S40, a message information processing section 311 may transmit the same message information to all the player terminals 20 via a communication section 32. Consequently, the same message is displayed in all the player terminals 20.

In another aspect, messages may be independently displayed in the player terminals 20. For example, in step S30, a manipulation information obtaining section 112 obtains, via an input section 13, manipulation information designating a player terminal 20 or a player to which a message is to be transmitted. Then, in step S32, in accordance with the manipulation information, a message transmitting section 113 determines terminal information indicating the player terminal 20 to which the message is to be transmitted, and transmits message information including the terminal information, such as the one indicated in FIG. 22. In step S40, a message information processing section 311 transmits the message information to the player terminal 20 indicated by the terminal information included in the message information. With this, it is possible to transmit the message information to the player terminal 20 designated by the user.

With this, the user can make only a particular player among the plurality of players recognize the user's message. Thus, the user can cheer on the particular player in a special manner. In addition, the user can cheer on a player terminal 20 individually. This can increase the cheering opportunities in accordance with the number of player terminals 20.

In step S30, the manipulation information obtaining section 112 may obtain, via the input section 13, manipulation information designating a player terminal 20 or a player to which a consumption value is to be provided. Then, in step S32, in accordance with the manipulation information, the message transmitting section 113 determines destination information indicating the player to which the consumption value is to be provided, and transmits message information including terminal information, such as the one indicated in FIG. 22. In step S40, the message information processing section 311 provides the player indicated by the destination information in the message information a part or whole of consumption value indicated by consumed amount information in the message information. With this, it is possible to provide the consumption value to the player designated by the user.

There has been a mechanism for providing a consumption value to a video distributor. With this mechanism, however, in a case where a consumption value is provided to a video in which multiple players fight against each other, it is impossible to specify a player to whom the consumption value is provided. Meanwhile, with the above-described configuration, the user can provide a consumption value only to a particular player among the multiple players. This can increase user's motivation for cheering.

(Adjustment of Exposure Degree)

In Embodiment 1, the message information processing section 311 adjusts, in step S36, the exposure degree in accordance with the consumed amount information. However, this is not limitative. Alternatively, the message display section 213 may adjust, in step S44, the exposure degree in accordance with the consumed amount information. In this case, in step S40, the message information processing section 311 may transmit, to the player terminal 20, the message information including the consumed amount information.

In step S30, the manipulation information obtaining section 112 may obtain, via the input section 13, manipulation information directly designating a display period and a focus according to which a message is to be displayed. Then, in step S32, the message transmitting section 113 may determine the display period and focus in accordance with the manipulation information, and may transmit message information including the display period and focus. In this case, in step S36, the message information processing section 311 does not carry out the adjustment of the exposure degree.

In step S44, the message display section 213 may further adjust the display period and focus associated with the message information. That is, the message display section 213 may adjust the exposure degree of the message to be displayed in the scene indicated by the scene information included in the message information.

In an aspect, the message display section 213 may carry out the adjustment of the exposure degree in accordance with manipulation information indicating manipulation carried out by the player with respect to the player terminal 20. That is, at least one of manipulation for increasing the exposure degree and manipulation for reducing the exposure degree may be carried out with respect to the player terminal 20.

By adjusting the exposure degree in the player terminal 20 as appropriate, it is possible to maintain an exposure degree suitable for the player. In an example, the player can increase the exposure degree to more surely recognize the message, whereas the player can reduce the exposure degree to increase his/her concentration on the play.

In an aspect, the message display section 213 may adjust, as an exposure degree of a message to be displayed in a scene indicated by scene information included in message information, either or both of a display period and a display mode according to which the message is to be displayed.

In an aspect, the message display section 213 may adjust either or both of the display period and display mode in accordance with manipulation information indicating manipulation carried out by the player with respect to the player terminal 20. That is, at least one of manipulation for elongating the display period, manipulation for shortening the display period, manipulation for increasing a degree of emphasis in the display mode, and manipulation for reducing the degree of emphasis in the display mode can be carried out with respect to the player terminal 20.

By adjusting either or both of the display period and display mode in the player terminal 20 as appropriate, it is possible to maintain a display period or a display mode suitable for the player. In an example, the player can elongate the display period so as to be longer (by one minute) than a reference (e.g., five minutes) to more surely recognize the message, whereas the player can shorten the display period so as to be shorter (by one minute) than the reference to increase his/her concentration on the play. Further, the player can select, as the display mode, a mode in which the degree of emphasis is increased so as to be higher than a reference (e.g., a mode with an increased font size) to more surely recognize the message, whereas the player can select, as the display mode, a mode in which the degree of emphasis is reduced (e.g., a mode with a reduced font size) to increase his/her concentration on the play, for example.

(Ticket)

Figure 23:
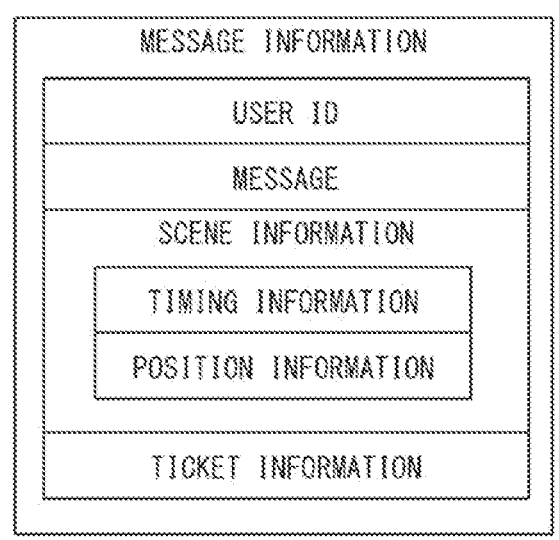
FIG. 23 is a view illustrating a data structure of message information in accordance with the variation of Embodiment 1 of the present invention.
Figures 24, 25, 26:
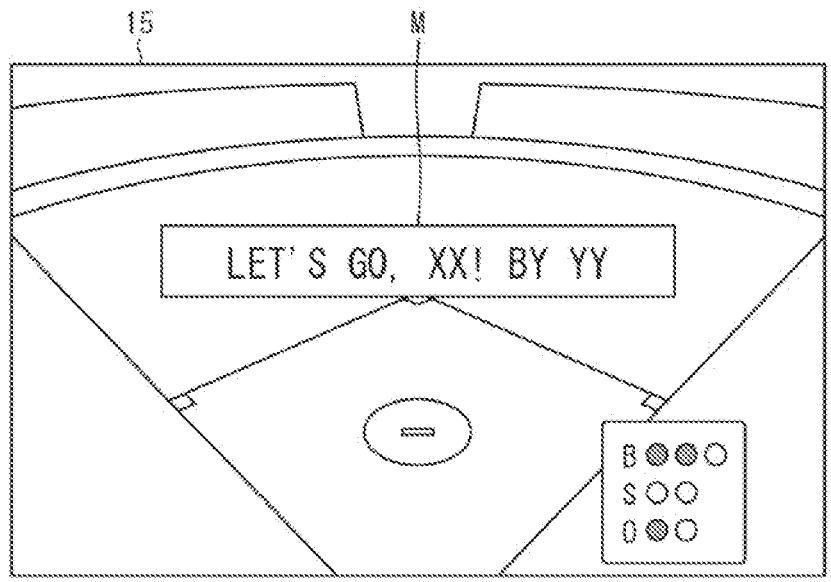
FIG. 24 is a table illustrating an example of a part of server management user data in accordance with a variation of Embodiment 1 of the present invention.
FIG. 25 is a view illustrating an example of display of a message in accordance with message information in accordance with a reference embodiment.
FIG. 26 is a view illustrating an example of information related to collection in Embodiment 2 of the present invention.

In an aspect, a timing at which the user's consumption value is consumed may differ from a timing at which a message is displayed. For example, the information processing system 1 may have the following configuration. That is, a ticket is obtained in advance in exchange for a consumption value, and, instead of the consumption value, the ticket is consumed to display a message. FIG. 23 is a view illustrating an example of a data structure of message information in accordance with this aspect. FIG. 24 is a table illustrating an example of a part of server management user data in accordance with this aspect.

In this aspect, the user can purchase the ticket in advance. In accordance with manipulation with respect to the user terminal 10, the control section 110 transmits, to the game server 30, ticket purchase instruction information indicating a user ID and the number of purchased tickets. As shown in FIG. 24, the server management user data includes the numbers of tickets possessed by respective users. In accordance with the ticket purchase instruction information having been received, the control section 310 reduces the number of possessed coins associated with a user ID by a number corresponding to the number of purchased tickets, and increases the number of possessed tickets by the number of purchased tickets.

In this aspect, the user can use a purchased ticket to transmit a message. In accordance with manipulation with respect to the user terminal 10, the message transmitting section 113 transmits message information including ticket information such as the one shown in FIG. 23. The ticket information is information indicating (i) whether or not a ticket possessed by the user is to be consumed or (ii) the number of consumed tickets out of the possessed tickets.

In this aspect, in step S36, the message information processing section 311 reduces, in accordance with the ticket information, the number of user's possessed tickets. In step S38, the message information processing section 311 may set, in accordance with the ticket information, at least one of the display period and focus according to which the message is to be displayed.

The server data may include ticket consumed amount setting data in place of the consumed amount setting data. The ticket consumed amount setting data includes a plurality of scenes. Each of the scenes is associated with the number of tickets set to be consumed in exchange for display of a message in the each of the scenes. In this case, in step S32, the message transmitting section 113 may refer to the ticket consumed amount setting data to determine the ticket information in accordance with a scene indicated by an option selected in the object O21.

Reference Example

In Embodiment 1, the message display section 213 displays a message at certain coordinates or in a certain object in the game space. Meanwhile, in one reference example, the message display section 213 superimposes a message M on an image which depicts the game space and which is displayed in the display section 25, as shown in FIG. 25. In this case, the message is not displayed in the game space, and thus is not a natural presentation. This, however, can simplify the procedure, thereby reducing the burden.

Embodiment 2

The following description will discuss another embodiment of the present invention. In Embodiment 1, simply, the game server 30 preferentially processes a message received earlier. Embodiment 2 will deal with a configuration in which a game server 30 selects, in accordance with a consumed amount indicated by consumed amount information, message information to be processed. For convenience of explanation, any member of the present embodiment that is identical in function to a member described for any embodiment above is assigned a common reference sign and is not described here again.

In an aspect, a message information processing section 311 (one example of the selection transmitting section) of the game server 30 transmits, to a player terminal 20, selected message information that is selected from among one or more pieces of message information received from a plurality of user terminals 10, in accordance with consumed amount information included in the one or more pieces of message information. The user terminals 10 transmit the pieces of message information to the game server 30 in a similar manner to that in Embodiment 1. The player terminal 20 displays, in accordance with the selected message information, a message in a game space in a similar manner to that in Embodiment 1.

In an aspect, the message information processing section 311 carries out the selection of the selected message information from among the one or more pieces of message information at each time of collection. That is, the message information processing section 311 selects, from among one or more pieces of message information corresponding to certain collection, selected message information corresponding to the certain collection. In an aspect, each collection is associated with a collection period. The one or more pieces of message information corresponding to the certain collection should be transmitted from the user terminals 10 in the collection period associated with the certain collection. In an aspect, the selected message information corresponding to the certain collection may be selected from among the one or more pieces of message information corresponding to the certain collection by a method with prompt decision or a method without prompt decision.

In an aspect, the collection is associated with a scene which is included in the game space and in which a message is to be displayed. That is, the message information processing section 311 may select selected message information for each scene which is included in the game space where the game progresses and in which a message is to be displayed, and may transmit, to the player terminal 20, the selected message information thus selected. However, Embodiment 2 is not limited to this. Alternatively, the collection may be associated with a certain point of time in a real world, for example.

FIG. 26 is a view illustrating an example of information related to collection set by the message information processing section 311. In the example shown in FIG. 26, each collection ID is associated with a collection subject, a collection period, the presence or absence of prompt decision, and a price of prompt decision, each of which specifies message information corresponding to the collection.

Figure 27:
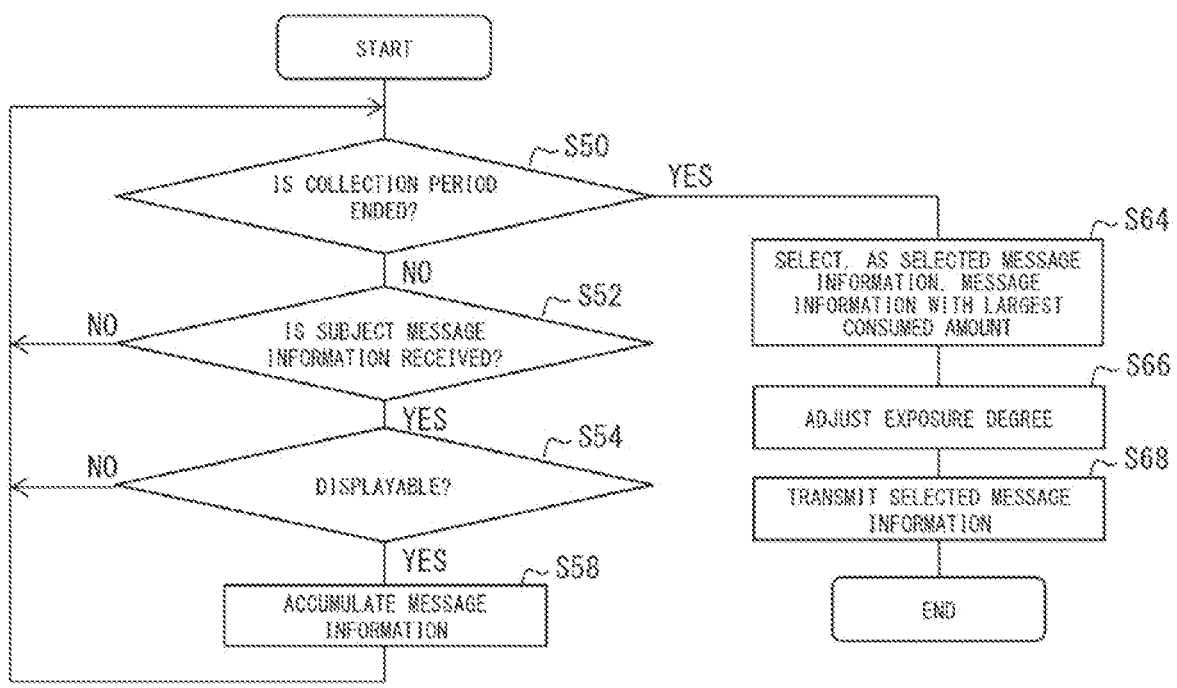
FIG. 27 is a flowchart illustrating an example of a flow of operation of a game server in accordance with Embodiment 2 of the present invention.

FIG. 27 is a flowchart illustrating a flow of how the game server 30 operates to select selected message information by a method without prompt decision. The message information processing section 311 executes, for each collection, operation shown in FIG. 27.

The message information processing section 311 first determines whether or not a collection period is ended (step S50). If the collection period is not ended (NO in step S50), the message information processing section 311 determines whether or not message information corresponding to a collection subject is received from the user terminal(s) 10 (step S52). For example, in a case of FIG. 26 in which the collection ID is "0001", message information including timing information indicating a timing of switch between offence and defense in the 6th inning is the message information corresponding to the collection subject. If the message information corresponding to the collection subject is not received (NO in step S52), the process returns to step S50. If the message information corresponding to the collection subject is received (YES in step S52), the message information processing section 311 determines, from the viewpoints of a consumed amount and a content of a message, whether or not the received message information corresponding to the collection subject is displayable in a similar manner to that in step S36 shown in FIG. 9 (step S54). Note that step S54 does not determine whether or not a scene of the message is the same as a scene of another message. If it is determined that the received message information corresponding to the collection subject is not displayable (NO in step S54), the process returns to step S50. If it is determined that the received message information corresponding to the collection subject is displayable (YES in step S54), the message information processing section 311 accumulates, in the storage section 34, the received message information corresponding to the collection subject in association with the collection (step S58).

If the collection period is ended (YES in step S50), the message information processing section 311 selects, from among pieces of message information corresponding to the collection subject accumulated in the storage section 34, a piece of message information including consumed amount information indicating a largest consumed amount as selected message information (step S64). After that, in similar manners to those in steps S38 and S40 shown in FIG. 9, the message information processing section 311 sets an exposure degree associated with the selected message information (step S66) and transmits the selected message information to the player terminal 20 (step S68). Among the pieces of message information corresponding to the collection subject accumulated in the storage section 34, pieces of message information other than the selected message information are discarded, and the consumption values possessed by the users who have transmitted these pieces of message information are not consumed. The message information processing section 311 may transmit, to the user terminals 10, a message informing that.

In an aspect, in a case where the consumed amount indicated by the consumed amount information included in the message information accumulated in the storage section 34 by the message information processing section 311 in step S58 is the largest among the consumed amounts indicated by the pieces of consumed amount information included in the pieces of message information corresponding to the collection subject already accumulated in the storage section 34, this consumed amount may be notified to the user terminals 10. The manipulation information obtaining sections 112 of the user terminals 10 notified of the consumed amount may cause the display sections 15 to display the consumed amount. With this, the user can transmit message information while designating a consumed amount larger than the displayed consumed amount, thereby increasing the possibility that the message may be displayed for the collection.

In another aspect, in step S58, the message information processing section 311 may not notify the consumed amount to the user terminals 10.

Figure 28:
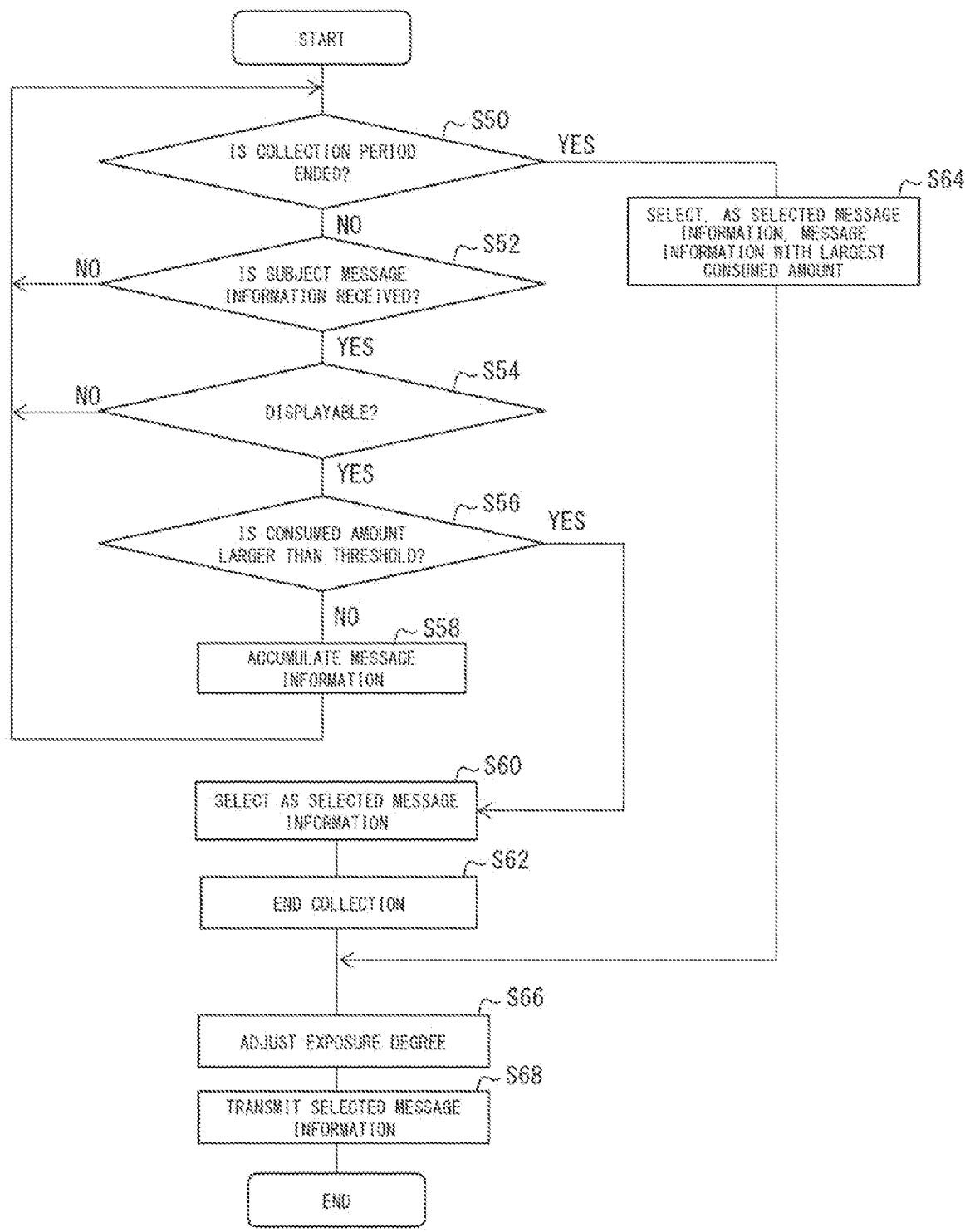
FIG. 28 is a flowchart illustrating an example of a flow of operation of a game server in accordance with Embodiment 2 of the present invention.

FIG. 28 is a flowchart illustrating a flow of how the game server 30 operates to select selected message information by a method with prompt decision. The message information processing section 311 executes, for each collection, operation shown in FIG. 28.

Steps S50 to S54 are identical to those described above, and description thereof will be omitted here. If it is determined that the received message information corresponding to the collection subject is displayable (YES in step S54), the message information processing section 311 determines whether or not the consumed amount indicated by the consumed amount information included in the received message information corresponding to the collection subject is larger than a threshold (step S56). If the consumed amount is not larger than the threshold (NO in step S56), the procedure advances to step S58. If the consumed amount is larger than the threshold (YES in step S56), the message information processing section 311 selects the message information as the selected message information (step S60).

Then, the message information processing section 311 notifies the user terminals 10 of end of the collection.

Steps S58 and S64 to S68 are identical to those described above, and description thereof will be omitted here. In the operation shown in FIG. 28, if message information including information indicating a consumed amount larger than the threshold is received from any of the plurality of user terminals 10, the message information processing section 311 selects, as selected message information, the message information including the information indicating the consumed amount larger than the threshold.

Effects of Embodiment 2

As described above, the information processing system 1 in accordance with Embodiment 2 includes: the player terminal 20 that controls progress of a game; and the game server 30 that is communicably connected with the player terminal 20, the plurality of user terminals 10 communicably connected with the game server 30, each of the plurality of user terminals 10 including the message transmitting section 113 that transmits, in accordance with manipulation carried out by the user with respect to the each of the plurality of user terminals 10, message information to the game server 30, the message information including at least (i) a message and (ii) information indicating a consumed amount of a consumption value possessed by a user which consumed amount is associated with the message, the game server 30 including the message information processing section 311 that transmits selected message information to the player terminal 20, the selected message information being selected from among the one or more pieces of message information in accordance with pieces of information indicating consumed amounts included in one or more pieces of message information received from the plurality of user terminals 10, the player terminal 20 including the message display section 213 that displays the message in a game space in accordance with the selected message information received from the game server 30.

The player is concentrated on playing the game. Therefore, if a message entered by the user is displayed at a location outside the game space, the player hardly notices the message. With the above configuration, the message is displayed in the game space. This allows the player to easily recognize the message. This can suppress the decline of user's desire to transmit a message.

However, the scenes in the game space that can display a message without inhibiting the progress of the game are limited. Thus, depending on the situation, it is necessary to select a part of messages and to display only the part of the messages in the game space. In this case, if a user can transmit a message for free, the number of messages increases, which may lead to a situation in which most of the messages are not displayed and thus user's desire to transmit a message is declined. Meanwhile, with the above configuration, a message is displayed in accordance with the consumed amount of the consumption value. Consequently, for a user having a stronger desire to transmit a message, the possibility to display a message is increased. This can suppress the decline of user's desire to transmit a message.

In an aspect, the message information processing section 311 selects, as the selected message information, a piece of message information including information indicating a largest consumed amount from among the one or more pieces of message information. This can make users compete against each other in the consumed amount of the consumption value, which is used to display a message. This can be amusement for the users.

In an aspect, the message information processing section 311 selects, as the selected message information, message information including information indicating a consumed amount larger than the threshold, in a case where the message information including the information indicating the consumed amount larger than the threshold is received from any of the plurality of user terminals 10. With this, if a message has a consumed amount of a consumption value, which is used to display a message, larger than the threshold, the message is displayed without competition against other users. This can prevent an unnecessarily high rise of the consumed amount. This can also suppress a situation in which a user who does not like to compete against other users loses his/her desire to transmit a message.

In an aspect, the message information processing section 311 selects the selected message information for each scene which is included in the game space where the game progresses and in which a message is to be displayed, and transmits, to the player terminal 20, the selected message information thus selected.

This can make users compete against each other, for each scene, in the consumed amount of the consumption value, which is used to display a message. In a case where ease of recognition of a message varies depending on the scene, competition between the users is expected to become severe for a scene with a high degree of ease of recognition of a message. This allows the users to select, in consideration of the ease of recognition, a scene to display his/her message. This can be amusement for the users.

Variations

The message information transmitted from each user terminal 10 to the game server 30 only needs to include at least a message and consumed amount information, and does not necessarily have to include scene information.

The number of pieces of selected message information that the message information processing section 311 selects for single collection is not limited to one. The message information processing section 311 may select two or more pieces of selected message information for single collection. For example, for collection for a centerfield screen, the message information processing section 311 may select two pieces of selected message information, and the message display section 213 may display the messages included in the two pieces of selected message information in upper and lower halves of the centerfield screen, respectively.

In an aspect, in a case where the message information processing section 311 selects N selected messages for certain collection (N is a natural number), the message information processing section 311 (i) may select, as selected message information, pieces of message information including pieces of information indicating first to N-th largest consumed amounts among one or more pieces of message information received for the certain collection or (ii) may select, as selected message information, pieces of message information including pieces of information indicating consumed amounts larger than the threshold and being received in first to N-th places for the certain collection.

Similarly to Embodiment 1, the number of player terminals 20 may be two or more. Further, in accordance with manipulation with respect to the user terminal 10, the message transmitting section 113 may incorporate, into message information, terminal information indicating a player terminal 20 in which a message is to be displayed. Furthermore, the message information processing section 311 may transmit selected message information to the player terminal 20 indicated by the terminal information included in the selected message information. The details and effects of this configuration are similar to those of Embodiment 1.

Similarly to Embodiment 1, in step S44, the message display section 213 may further adjust a display period and a focus associated with the message information. That is, the message display section 213 may adjust an exposure degree of the message to be displayed in a scene indicated by the scene information included in the message information. The details and effects of this configuration are similar to those of Embodiment 1.

Similarly to Embodiment 1, in an aspect, the message display section 213 may adjust, as the exposure degree of the message to be displayed in the scene indicated by the scene information included in the message information, either or both of the display period and display mode according to which the message is to be displayed. The details and effects of this configuration are similar to those of Embodiment 1.

Similarly to Embodiment 1, the message display section 213 may display, in the game space, the message at a higher exposure degree, as the consumed amount indicated by the consumed amount information included in the message information increases.

With this, a message given by manipulation of a user who has consumed more consumption value achieves a higher exposure degree. This makes it possible to preferentially treat the user who has consumed more consumption value. In addition, this allows the user to select the exposure degree of the message by the consumed amount.

Embodiment 3

The following description will discuss another embodiment of the present invention. Embodiment 1 has discussed the configuration in which the message is displayed in the game space. Meanwhile, Embodiment 3 will deal with a configuration in which a message is provided via audio output. For convenience of explanation, any member of the present embodiment that is identical in function to a member described for any embodiment above is assigned a common reference sign and is not described here again.

(Functional Configuration of Player Terminal 20A)

Figure 29:
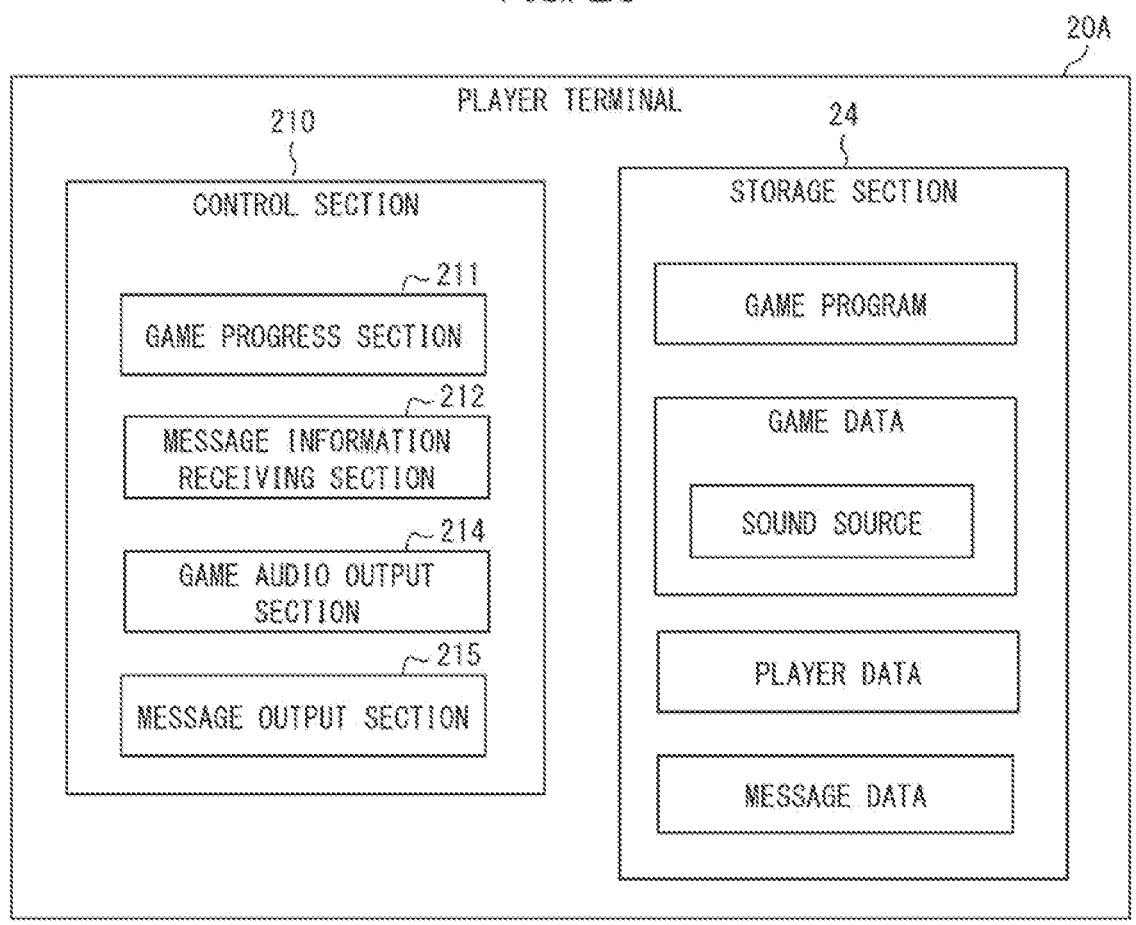
FIG. 29 is a view illustrating an example of a functional configuration of a player terminal in accordance with Embodiment 3 of the present invention.

FIG. 29 is a block diagram illustrating an example of a functional configuration of a player terminal 20A in accordance with Embodiment 3.

A control section 210 includes a game progress section 211, a message information receiving section 212 (one example of the receiving section), a game audio output section 214, and a message output section 215.

A storage section 24 stores therein a game program, game data including a sound source, player data, and message data.

The sound source is data that is referred to in order to carry out audio output. The sound source may be, for example, audio data including recorded audio, a phoneme set used to compose audio, and/or data indicating a sounding position in a virtual space (game space) where the game progresses. To specify a sound source means to specify at least one of the sound source, the phoneme set, and the sounding position.

With use of the sound source (certain sound source) included in the game data, the game audio output section 214 outputs, via the audio output section 26, audio corresponding to the progress of the game. Examples of the certain sound source encompass a sound source of spectators' cheers, a sound source of a stadium announcer, and a sound source of a play-by-play announcer.

Figure 30:
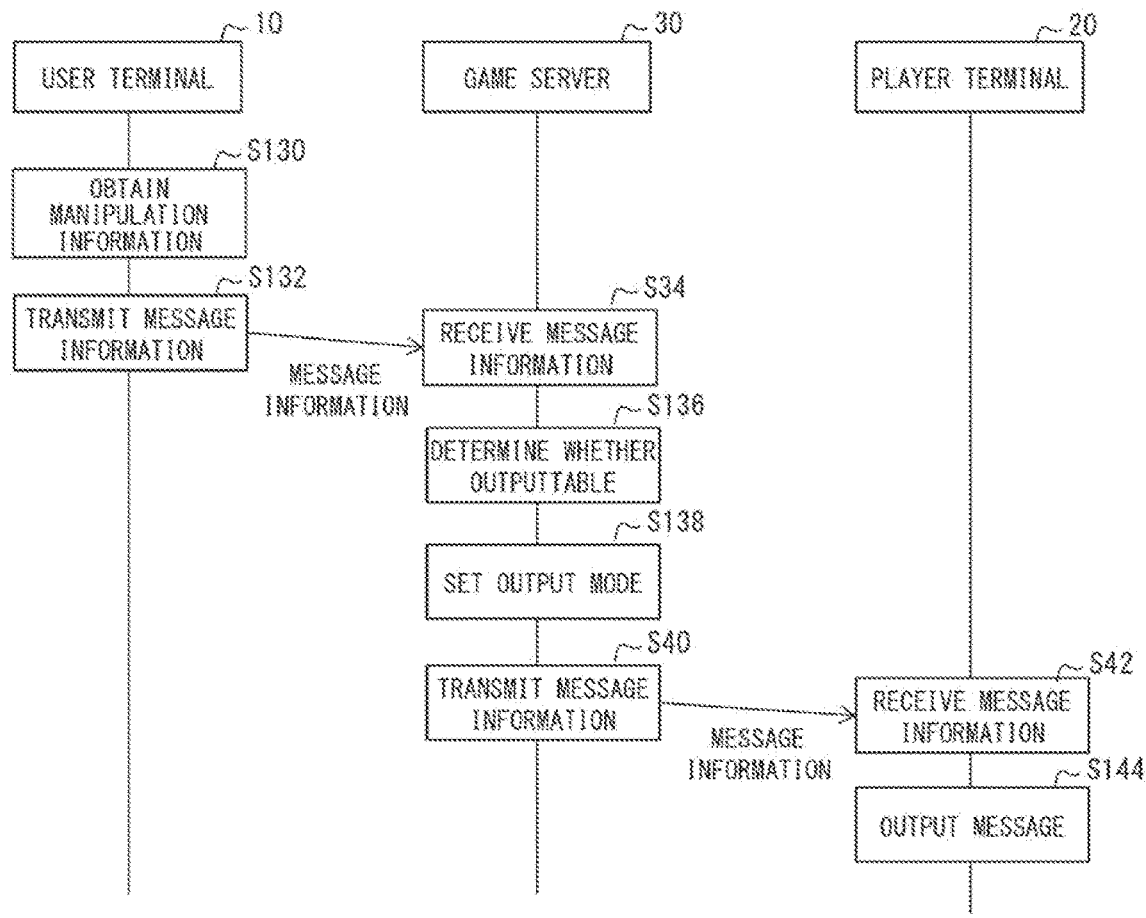
FIG. 30 is a flow diagram illustrating an example of a flow of a message transmitting process to be carried out by the information processing system in accordance with Embodiment 3 of the present invention.

FIG. 30 is a flow diagram illustrating an example of a flow of a message transmitting process in accordance with Embodiment 3.

Similarly to step S30, in a user terminal 10, a manipulation information obtaining section 112 obtains, via an input section 13, manipulation information indicating manipulation carried out by a user with respect to the user terminal 10 (step S130), and a message transmitting section 113 transmits message information to the game server 30 in accordance with the manipulation information (step S132).

The message information transmitted in step S132 includes at least a message. That is, the message transmitting section 113 transmits, in accordance with the manipulation carried out by the user with respect to the user terminal 10, the message information including at least the message.

The message information transmitted in step S132 may further include timing information indicating a timing to provide the message via audio output during playing of the game, sound source information indicating a sound source used to provide the message via audio output during playing of the game, and consumed amount information indicating a consumed amount of a consumption value possessed by a user which consumed amount is associated with the message.

Figure 31:
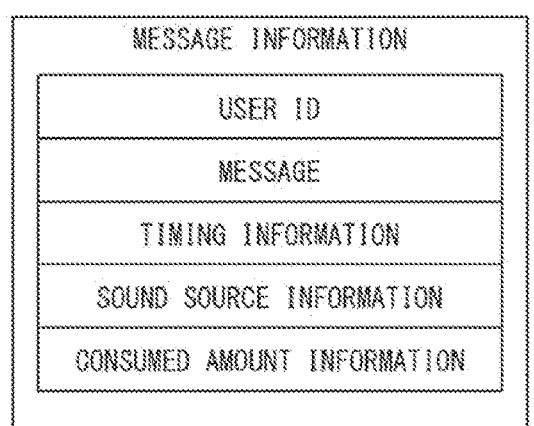
FIG. 31 is a view illustrating an example of a data structure of message information in accordance with Embodiment 3 of the present invention.

FIG. 31 is a view illustrating an example of a data structure of message information in accordance with Embodiment 3. The message information includes a user ID, a message, timing information, sound source information, and consumed amount information. In Embodiment 3, the data structure of the message information is not limited to this. The message information may not include a part of the above-described pieces of information or may include additional information.

The message transmitting section 113 obtains a user ID included in user data from, e.g., the storage section 14. In accordance with the manipulation information obtained by the manipulation information obtaining section 112, the message transmitting section 113 determines a message, timing information, sound source information, and consumed amount information to generate message information, and transmits the message information via a communication section 12.

The manipulation information obtaining section 112 may obtain audio by a microphone included in the user terminal 10, and the message transmitting section 113 may determine the audio as a message. This makes it possible to directly transmit user's voice to the player.

The message information transmitted from the user terminal 10 is received by the communication section 32 of the game server 30 (step S34). The message information processing section 311 starts a process on the message information.

The message information processing section 311 first determines, from some points of view, whether or not the message information is outputtable (step S136).

First, if the number of possessed coins associated with the user ID included in the received message information is smaller than a consumed amount indicated by consumed amount information included in the message information, the message information processing section 311 determines that the message information is not outputtable.

The message information processing section 311 further determines whether or not the message included in the received message information includes an expression (so-called NG word) inappropriate to output. If the message information includes such an expression, the message information processing section 311 determines that the message information is not outputtable or converts the expression into another character string.

In a case where the message included in the received message information is audio, the message information processing section 311 converts the audio into a text to determine whether or not the message includes an expression inappropriate to output. If the message includes such an expression, the message information processing section 311 determines that the message information is not outputtable or converts the audio into another audio.

There may be a case where pieces of message information that the game server 30 has received from the plurality of user terminals 10 indicate the same timing to output a message. In such a case, the game server 30 may preferentially process a message received earlier. In an aspect, the message information processing section 311 may determine that it is impossible to output a piece of message information including information indicating a timing identical to that of a piece of message information having been already received (except for a piece of message information determined not to be outputtable). In order to prevent a situation in which the user terminals 10 transmit pieces of message information indicating the same timing to output a message, the message information processing section 311 may notify, via the communication section 32, the user terminals 10 of received information indicating a scene of information having been already received. Upon reception of the received information, the user terminals 10 may gray out, in step S130, an option for selecting the scene indicated by the received information so as to make it unselectable.

If the message information processing section 311 determines that the received message information is outputtable, the message information processing section 311 reduces the number of user's possessed coins in the server management user data by a number indicated by the consumed amount information included in the message information, and continues the process on the message information. Meanwhile, if the message information processing section 311 determines that the received message information is not outputtable, the message information processing section 311 may stop the process on the message information and may transmit, to the user terminals 10, a message informing that the message information is not outputtable.

Then, the message information processing section 311 sets an output mode associated with the message information determined to be outputtable (step S138).

The output mode refers to a mode according to which a message is provided via audio output. For example, the output mode may be a sound volume at which the message is provided via audio output, the number of times of providing the message via audio output, or a sound effect to be applied to audio output of the message. The sound effect may be, for example, echo, reverb, chorus, pitch-shifting, equalizing, and/or delaying.

In Embodiment 3, in accordance with the consumed amount information included in the message information, the message information processing section 311 sets a sound volume and a sound effect used when the message is displayed. The message information processing section 311 sets a higher sound volume and a sound effect used when the message is displayed, as the consumed amount indicated by the consumed amount information included in the message information increases.

FIG. 32 is a table illustrating output mode setting data included in the server data. As shown in FIG. 32, the output mode setting data includes a range of a consumed amount, a sound volume, and a sound effect. The sound volume and sound effect are associated with the range of the consumed amount. In an aspect, the message information processing section 311 may refer to the output mode setting data to set, in accordance with the consumed amount information included in the message information, the sound volume and sound effect associated with the message information.

Then, the message information processing section 311 transmits, to the player terminal 20, the message information for which the sound volume and sound effect are set (step S40).

FIG. 33 is a view illustrating an example of the message information to be transmitted from the game server 30 to the player terminal. The message information processing section 311 gives an identifier (command ID) to each piece of message information. The message information processing section 311 refers to the server management user data to obtain the user name associated with the user ID included in the message information. The message information processing section 311 transmits, to the player terminal 20 via the communication section 32, (i) the obtained user name and (ii) the sound volume and sound effect set in step S38 in association with the message information. Note that, as shown in FIG. 33, the message information transmitted from the game server 30 to the player terminal may not include the user ID or the consumed amount information. Alternatively, the message information transmitted from the game server 30 to the player terminal may include these pieces of information.

The message information receiving section 212 of the player terminal 20 receives, via the communication section 22, the message information from the game server 30, and accumulates the message information in the storage section 24 (step S42). The message output section 215 processes, as necessary, the message information accumulated in the storage section 24 to provide the message via audio output (step S144). The message is output from the audio output section 26, and is output from the audio output section 16 of the user terminal 10 after being transmitted via the video distribution server 40.

In a case where the timing information included in the message information indicates a certain timing, the message output section 215 starts outputting the message when the certain timing comes. In a case where the timing information is not included in the message information or the timing information included in the message information does not designate a certain timing, the message output section 215 may start outputting the message immediately after receiving the message information.

In an aspect, the message output section 215 may determine, as a timing to provide the message via audio output, a timing that satisfies a given condition concerning progress of the game.

The given condition concerning the progress of the game refers to a condition concerning one or more processes included in a series of processes to be executed so as to make the game progress. The one or more processes may be, for example, a process for accepting manipulation for making the game progress, a process for controlling arrangement of an object(s) in a game space in accordance with manipulation for making the game progress, a process for calculating an in-game parameter in accordance with manipulation for making the game progress, a process for exchanging, with an external entity, information required to make the game progress, and/or a process for displaying an image indicating progress of the game. The given condition may be, for example, a condition concerning a progress status of the one or more processes, a condition concerning a result of the one or more processes, a condition concerning a parameter to be used in the one or more processes, a condition concerning an image or audio to be output as a result of the one or more processes, and/or a condition concerning an object to be processed in the one or more processes. Examples of such a condition encompass a condition that switch between offence and defense takes place at a certain inning in the progress of a baseball game, a condition that a certain team hits a home run, a condition that a distance between a certain in-game player and a football gall post is not larger than a threshold in the progress of a football game, a condition that announcement is interrupted during playing of the game, and/or a condition that a certain in-game player stands on a batter's box.

In a case where the sound source information included in the message information indicates a certain sound source, the message output section 215 outputs the message with use of the certain sound source. In a case where the sound source information is not included in the message information or the sound source information included in the message information does not designate a certain sound source, the message output section 215 may output the message with use of a predetermined sound source.

In a case where the sound volume information included in the message information indicates a certain sound volume, the message output section 215 outputs the message at the certain sound volume. In a case where the sound volume information is not included in the message information or the sound volume information included in the message information does not designate a certain sound volume, the message output section 215 may output the message at a predetermined sound volume.

In a case where the sound effect information included in the message information indicates a certain effect, the message output section 215 outputs the message with the certain effect. In a case where the sound effect information is not included in the message information or the sound effect information included in the message information does not designate a certain effect, the message output section 215 may output the message without any sound effect.

For example, as shown in FIG. 33, message information including "0001" as a command ID includes "LET'S GO, XX!" as a message, "NO DESIGNATION" as a timing, "SPECTATORS" as a sound source, and "3" as a sound volume. In a case where the message output section 215 carries out audio output in accordance with the message information, the message output section 215 refers to the sound source and message included in the message information to provide the message "LET'S GO, XX!" via audio output with use of the sound source of the spectators. The message output section 215 also refers to the timing included in the message information to start audio output of the message immediately after the player terminal 20 receives the message information. The message display section 213 also provides the message via audio output at a sound volume corresponding to the sound volume included in the message information.

As shown in FIG. 33, message information including "0002" as a command ID includes "BE RELENTLESS AND AMBITIOUS" as a message, "6TH INNING, SWITCH BETWEEN OFFENCE AND DEFENSE" as a timing, "STADIUM ANNOUNCER" as a sound source, "5" as a sound volume, and "ECHO" as an effect. In a case where the message output section 215 carries out audio output in accordance with the message information, the message output section 215 refers to the sound source and message included in the message information to provide the message "BE RELENTLESS AND AMBITIOUS" via audio output with use of the sound source of the stadium announcer. The message output section 215 also refers to the timing included in the message information to start audio output of the message at the timing of switch between offence and defense in the 6th inning. The message display section 213 provides the message via audio output at a sound volume corresponding to the sound volume included in the message information. The message display section 213 refers to the effect included in the message information to provide the message via audio output with an echo effect.

Effects of Embodiment 3

As described above, the information processing system in accordance with Embodiment 1 includes: the player terminal 20 that controls progress of a game; and the user terminal 10 that is communicably connected with the player terminal 20 and that does not have a function to control progress of the game, the user terminal 100 including the message transmitting section 113 that transmits, in accordance with manipulation carried out by a user with respect to the user terminal 10, message information including at least a message, the player terminal 20 including the message information receiving section 212 that receives the message information and the message output section 215 that provides, in accordance with the message information, the message via audio output during playing of the game.

The player is concentrated on playing the game. Therefore, even when a message entered by the user is displayed on a game screen, the player hardly notices the message. With the above configuration, a message is provided via audio output during playing of the game. This allows the player to easily recognize the message. In addition, since the message is provided via audio output, the message would not hinder the player's eyesight, and would not become an obstacle to playing of the game.

In an aspect, the message output section 215 determines, as a timing to provide the message via audio output, a timing that satisfies a given condition concerning progress of the game.

If a message is provided via audio output without consideration of the progress of the game, the audio output of the message may possibly hinder the progress of the game. With the above configuration, the message is provided via audio output at a timing satisfying the given condition concerning the progress of the game. This makes it possible to provide the message via audio output at an effective timing without hindering the progress of the game.

In an aspect, the player terminal 20 includes the game audio output section 214 that outputs audio corresponding to the progress of the game with use of a certain sound source, and the message output section 215 provides the message via audio output with use of the certain sound source. With this, the sound source identical to that of the audio corresponding to the progress of the game is used. This makes it possible to provide the message via audio output without giving a sense of incompatibility.

In an aspect, in accordance with manipulation with respect to the user terminal 10, the message transmitting section 113 incorporates, into the message information, timing information indicating a timing to provide the message via audio output during playing of the game. Further, in accordance with the message information, the message output section 215 provides the message via audio output at the timing indicted by the timing information during playing of the game.

The user can designate a timing to provide the message via audio output. A message may give a different impression to the player depending on the timing to provide the message via audio output. With the above configuration, the user can designate a timing that the user considers suitable to provide the message via audio output.

In an aspect, in accordance with manipulation with respect to the user terminal 10, the message transmitting section 113 incorporates, into the message information, information indicating a sound source to be used to provide the message via audio output during playing of the game. Further, in accordance with the message information, the message output section 215 provides the message via audio output with use of the sound source during the playing of the game.

The user can designate a sound source to be used to provide the message via audio output. A message may give a different impression to the player depending on the sound source to be used. With the above configuration, the user can designate a sound source that the user considers suitable to provide the message via audio output.

In an aspect, in accordance with manipulation with respect to the user terminal 10, the message transmitting section 113 incorporates, into the message information, the consumed amount information indicating the consumed amount of the consumption value possessed by the user which consumed amount is associated with the message. Further, in accordance with the message information, the message output section 215 provides the message via audio output in an output mode corresponding to the consumed amount indicated by the consumed amount information during playing of the game.

With this, the message is provided via audio output in the output mode corresponding to the consumed amount of the consumption value. This makes it possible to preferentially treat the user who has consumed more consumption value, for example. In addition, the user can determine the output mode of the message by designating the consumed amount. Thus, the user can effectively cheer on the player.

Variations

Similarly to Embodiment 1, the number of player terminals 20 may be two or more. Further, in accordance with manipulation with respect to the user terminal 10, the message transmitting section 113 may incorporates, into message information, terminal information indicating a player terminal 20 in which a message is to be provided via audio output. Further, the message information processing section 311 may transmit selected message information to the player terminal 20 indicated by the terminal information included in the selected message information. The details and effects of this configuration are similar to those of Embodiment 1.

The information indicating a timing or a sound source may indicate any of a plurality of timings or any of a plurality of sound sources. Each of the plurality of timings or each of the plurality of sound sources may be associated with a consumed amount of a consumption value possessed by a user, the consumed amount being set, for the each of the plurality of timings or the each of the plurality of sound sources, to be consumed in exchange for audio output of the message at the each of the plurality of timings or with use of the each of the plurality of sound sources during playing of the game.

Different consumed amounts can be set for different timings to provide a message via audio output or for different sound sources used to provide a message via audio output. With this, in a case where ease of recognition of a message varies depending on the timing or sound source, a consumed amount corresponding to the ease of the recognition can be set for each timing or each sound source.

Similarly to Embodiment 2, in an aspect, the message information processing section 311 may transmit, to the player terminal 20, a piece of message information including information indicating a largest consumed amount among one or more pieces of message information received from the plurality of user terminals 10. The details and effects of this configuration are similar to those of Embodiment 2.

Software Implementation Example

The control blocks (in particular, the control sections 110, 210, and 310) of the user terminal 10, the player terminal 20, and the game server 30 can be realized by a logic circuit (hardware) provided in an integrated circuit (IC chip) or the like or can be alternatively realized by software.

In the latter case, each of the user terminal 10, the player terminal 20, and the game server 30 includes a computer that executes instructions of a program that is software realizing the foregoing functions. The computer includes, for example, at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

From the embodiments illustrated above, the following configurations are understood, for example. In order to facilitate understanding, the following description will discuss various aspects with use of reference signs in parentheses that correspond to the drawings for convenience. However, there is no intention to limit the present invention to the aspects shown in the drawings.

A first information processing system in accordance with an aspect of the present invention includes: at least one first terminal that controls progress of a game; and at least one second terminal that is communicably connected with the at least one first terminal and that does not have a function to control progress of the game, the at least one second terminal including a transmitting section that transmits, in accordance with manipulation carried out by a user with respect to the at least one second terminal, message information including at least (i) a message and (ii) information indicating a scene which is included in a game space where the game progresses and in which the message is to be displayed, the at least one first terminal including a receiving section that receives the message information and a message display section that displays the message in the scene in accordance with the message information.

With the above configuration, the player is concentrated on playing the game. Therefore, if a message entered by the user of the second terminal is displayed at a location outside the game space, the player hardly notices the message. With the above configuration, the message is displayed in the game space, which allows the player to easily recognize the message. The game may include a scene in which a message is noticeable and a scene in which a message is not noticeable. The user of the second terminal can designate a scene to display user's entered message, in order to make the message be recognized by the player. With this, the user of the second terminal can cheer on the player effectively.

The above-described first information processing system may be configured such that: in accordance with the manipulation, the transmitting section incorporates, into the message information, information indicating a consumed amount of a consumption value possessed by the user which consumed amount is associated with the message; and the message display section displays, in the scene, the message at a higher exposure degree as the consumed amount increases.

With the above configuration, a message given by manipulation of a user who has consumed more consumption value achieves a higher exposure degree. This makes it possible to preferentially treat the user who has consumed more consumption value. In addition, this allows the user to select the exposure degree of the message by the consumed amount.

The above-described first information processing system may be configured such that: the information indicating the scene indicates any of a plurality of scenes; and each of the plurality of scenes is associated with a consumed amount of the consumption value possessed by the user which consumed amount is set, for the each of the plurality of scenes, to be consumed in exchange for display of the message in the each of the plurality of scenes.

With the above configuration, it is possible to set different consumed amounts for different scenes. With this, in a case where ease of recognition of a message varies depending on the scene, a consumed amount corresponding to the ease of the recognition can be set for each scene.

The above-described first information processing system may be configured such that: the information indicating the scene includes information indicating a certain timing in progress of the game; and the message display section displays the message at the certain timing.

With the above configuration, the user can designate a timing to display a message. A message may give a different impression to the player depending on the timing to display the message. With the above configuration, the user can designate a timing that the user considers preferable to display the message.

The above-described first information processing system may be configured such that: the information indicating the scene includes information indicating a certain position in the game space; and the message display section displays the message at the certain position.

With the above configuration, the user can designate a position to display a message. A message may give a different impression to the player depending on the position to display the message. With the above configuration, the user can designate a position that the user considers suitable to display the message.

The above-described first information processing system may be configured such that: the at least one first terminal includes a plurality of first terminals; and in accordance with the manipulation, the transmitting section determines, from among the plurality of first terminals, a first terminal to which the message information is to be transmitted.

With the above configuration, the user can make only a particular player among a plurality of players recognize a message desired by the user. Thus, the user can cheer on the particular player in a special manner.

The above-described first information processing system may be configured such that: the message display section adjusts an exposure degree of the message to be displayed in the scene.

With the above configuration, the exposure degree can be adjusted in the first terminal as appropriate. This makes it possible to maintain an exposure degree suitable for the player. In an example, the player can increase the exposure degree to more surely recognize the message, whereas the player can reduce the exposure degree to increase his/her concentration on the play.

The above-described first information processing system may be configured such that: the message display section of the at least one first terminal adjusts, as an exposure degree of the message to be displayed in the scene, either or both of a display period and a display mode according to which the message is to be displayed.

With the above configuration, by adjusting either or both of the display period and display mode in the first terminal as appropriate, it is possible to maintain a display period or a display mode suitable for the player. In an example, the player can elongate the display period so as to be longer (by one minute) than a reference (e.g., five minutes) to more surely recognize the message, whereas the player can shorten the display period so as to be shorter (by one minute) than the reference to increase his/her concentration on the play. Further, the player can select, as the display mode, a mode in which a degree of emphasis is increased to be higher than a reference (e.g., a mode with an increased font size) to more surely recognize the message, whereas the player can select, as the display mode, a mode in which the degree of emphasis is reduced (e.g., a mode with a reduced font size) to increase his/her concentration on the play, for example.

A first information processing method in accordance with an aspect of the present invention includes the steps of: transmitting, by a second terminal being communicably connected with a first terminal that controls progress of a game and not having a function to control progress of the game, message information in accordance with manipulation carried out by a user with respect to the second terminal, the message information including at least (i) a message and (ii) information indicating a scene which is included in a game space where the game progresses and in which the message is to be displayed; receiving, by the first terminal, the message information; and displaying, by the first terminal, the message in the scene in accordance with the message information.

The above configuration brings about effects similar to those given by the above-described first information processing system.

A first program in accordance with an aspect of the present invention causes a computer, included in a second terminal being communicably connected with a first terminal that controls progress of a game and not having a function to control progress of the game, to execute the steps of: obtaining manipulation information indicating manipulation carried out by a user with respect to the second terminal; and transmitting, in accordance with the manipulation information, message information to the first terminal, the message information including at least (i) a message and (ii) information indicating a scene which is included in a game space where the game progresses in the first terminal and in which the message is to be displayed.

The above configuration brings about effects similar to those given by the above-described first information processing system.

A second program in accordance with an aspect of the present invention causes a computer, included in a first terminal that controls progress of a game, to execute the steps of: receiving message information from a second terminal (i) that is communicably connected with the first terminal, (ii) that does not have a function to control progress of the game, and (iii) that includes a transmitting section which transmits the message information in accordance with manipulation carried out by a user with respect to the second terminal, the message information including at least (i) a message and (ii) information indicating a scene which included in a game space where the game progresses and in which the message is to be displayed; and displaying the message in the scene in accordance with the message information.

The above configuration brings about effects similar to those given by the above-described first information processing system.

A second information processing system in accordance with an aspect of the present invention includes: at least one first terminal that controls progress of a game; a server communicably connected with the at least one first terminal; and a plurality of second terminals communicably connected with the server, each of the plurality of second terminals including a transmitting section that transmits, in accordance with manipulation carried out by a user with respect to the each of the plurality of second terminals, message information to the server, the message information including at least (i) a message and (ii) information indicating a consumed amount of a consumption value possessed by the user which consumed amount is associated with the message, the server including a selection transmitting section that transmits, to the at least one first terminal, selected message information that is selected from among one or more pieces of message information received from the plurality of second terminals in accordance with pieces of information indicating consumed amounts included in the one or more pieces of message information, the first terminal including a message display section that displays the message in the game space in accordance the selected message information received from the server.

With the above configuration, the player is concentrated on playing the game. Therefore, if a message entered by the user is displayed at a location outside the game space, the player hardly notices the message. With the above configuration, the message is displayed in the game space. This allows the player to easily recognize the message. This can suppress the decline of user's desire to transmit a message.

However, the scenes in the game space that can display a message without inhibiting the progress of the game are limited. Thus, depending on the situation, it is necessary to select a part of messages and to display only the part of the messages in the game space. In this case, if a user can transmit a message for free, most of the messages are not displayed and thus user's desire to transmit a message may be declined. Meanwhile, with the above configuration, a message is displayed in accordance with the consumed amount of the consumption value. Consequently, for a user having a stronger desire to transmit a message, the possibility to display a message is increased. This can suppress the decline of user's desire to transmit a message.

The above-described second information processing system may be configured such that: the selection transmitting section selects, as the selected message information, a piece of message information including information indicating a largest consumed amount from among the one or more pieces of message information.

The above configuration can make users compete against each other in the consumed amount of the consumption value, which is used to display a message. This can be amusement for the users.

The above-described second information processing system may be configured such that: the selection transmitting section selects, as the selected message information, message information including information indicating a consumed amount larger than a threshold, in a case where the message information including the information indicating the consumed amount larger than the threshold is received from any of the plurality of second terminals.

With the above configuration, if a message has a consumed amount of a consumption value, which is used to display the message, larger than the threshold, the message is displayed without competition against other users. This can prevent an unnecessarily high rise of the consumed amount. This can suppress a situation in which a user who does not like to compete against other users loses his/her desire to transmit a message.

The above-described second information processing system may be configured such that: the selection transmitting section selects the selected message information for each scene which is included in the game space where the game progresses and in which the message is to be displayed, and transmits, to the at least one first terminal, the selected message information thus selected.

The above configuration can make users compete against each other, for each scene, in the consumed amount of the consumption value, which is used to cause a message to be displayed. In a case where ease of recognition of a message varies depending on the scene, severe competition between the users is expected to occur in a scene in which a message is easy to be recognized. This allows the users to select, in consideration of the ease of recognition, a scene to display a message. This can be amusement for the users.

The above-described second information processing system may be configured such that: the at least one first terminal includes a plurality of first terminals; in accordance with the manipulation, the transmitting section incorporates, into the message information, terminal information indicating a first terminal in which the message is to be displayed among the plurality of first terminals; and the selection transmitting section transmits the selected message information to the first terminal indicated by the terminal information included in the selected message information.

With the above configuration, the user can transmit a message to a player on whom the user wishes to cheer. This can increase user's desire to transmit a message.

The above-described second information processing system may be configured such that: the message display section adjusts an exposure degree of the message to be displayed in the game space.

With the above configuration, the exposure degree can be adjusted in the first terminal as appropriate. This makes it possible to maintain an exposure degree suitable for the player. In an example, the player can increase the exposure degree to more surely recognize the message, whereas the player can reduce the exposure degree to increase his/her concentration on the play.

The above-described second information processing system may be configured such that: the message display section adjusts, as an exposure degree of the message to be displayed in the game space, either or both of a display period and a display mode according to which the message is to be displayed.

With the above configuration, by adjusting either or both of the display period and display mode in the first terminal as appropriate, it is possible to maintain a display period or a display mode suitable for the player. In an example, the player can elongate the display period so as to be longer (by one minute) than a reference (e.g., five minutes) to more surely recognize the message, whereas the player can shorten the display period so as to be shorter (by one minute) than the reference to increase his/her concentration on the play. Further, the player can select, as the display mode, a mode in which a degree of emphasis is increased to be higher than a reference (e.g., a mode with an increased font size) to more surely recognize the message, whereas the player can select, as the display mode, a mode in which the degree of emphasis is reduced (e.g., a mode with a reduced font size) to increase his/her concentration on the play, for example.

The above-described second information processing system may be configured such that: the message display section displays, in the game space, the message at a higher exposure degree, as the consumed amount increases.

With the above configuration, a message given by manipulation of a user who has consumed more consumption value achieves a higher exposure degree. This makes it possible to preferentially treat the user who has consumed more consumption value. In addition, this allows the user to select the exposure degree of the message by the consumed amount.

A second information processing method in accordance with an aspect of the present invention includes the steps of: transmitting, by each of a plurality of second terminals communicably connected with a server being communicably connected with a first terminal that controls progress of a game, message information to the server in accordance with manipulation carried out by a user with respect to the each of the plurality of second terminals, the message information including at least (i) a message and (ii) information indicating a consumed amount of a consumption value possessed by the user which consumed amount is associated with the message; transmitting, by the server, selected message information to the first terminal, the selected message information being selected from among one or more pieces of message information received from the plurality of second terminals in accordance with the pieces of information indicating the consumed amounts included in the one or more pieces of message information; and displaying, by the first terminal, the message in the game space in accordance with the selected message information received from the server.

The above configuration brings about effects similar to those given by the above-described second information processing system.

A third program in accordance with an aspect of the present invention causes a computer, included in each of a plurality of second terminals communicably connected with a server being communicably connected with a first terminal that controls progress of a game, to execute the steps of: obtaining manipulation information indicating manipulation carried out by a user with respect to the each of the plurality of second terminals; and transmitting message information to the server in accordance with the manipulation information, the message information including at least (i) a message and (ii) information indicating a consumed amount of a consumption value possessed by the user which consumed amount is associated with the message, the server transmitting, to the first terminal, selected message information being selected from among one or more pieces of message information received from the plurality of second terminals in accordance with the pieces of information indicating the consumed amounts included in the one or more pieces of message information, the selected message information being used to display the message in the game space in the first terminal.

The above configuration brings about effects similar to those given by the above-described second information processing system.

A fourth program in accordance with an aspect of the present invention causes a computer, included in a first terminal that controls progress of a game and that is communicably connected with a server being communicably connected with a plurality of second terminals, to execute the steps of: receiving, from the server, selected message information being selected from among one or more pieces of message information received from the plurality of second terminals in accordance with pieces of information indicating consumed amounts included in the one or more pieces of message information, each of the plurality of second terminals transmitting, in accordance with manipulation carried out by a user with respect to the each of the plurality of second terminals, message information to the server, the message information including at least (i) a message and (ii) information indicating a consumed amount of a consumption value possessed by the user which consumed amount is associated with the message; and displaying the message in the game space in accordance with the selected message information.

The above configuration brings about effects similar to those given by the above-described second information processing system.

A fifth program in accordance with an aspect of the present invention causes a computer, included in a server communicably connected with a first terminal that controls progress of a game, receiving one or more pieces of message information from a plurality of second terminals which are communicably connected with the server and each of which transmits, in accordance with manipulation carried out by a user with respect to the each of the plurality of second terminals, message information to the server, the message information including at least (i) a message and (ii) information indicating a consumed amount of a consumption value possessed by the user which consumed amount is associated with the message; and transmitting selected message information to the first terminal, the selected message information being selected from among the one or more pieces of message information in accordance with the pieces of information indicating the consumed amounts included in the one or more pieces of message information, the selected message information being used to display the message in the game space in the first terminal.

The above configuration brings about effects similar to those given by the above-described second information processing system.

A third information processing system in accordance with an aspect of the present invention includes: at least one first terminal that controls progress of a game; and at least one second terminal that is communicably connected with the at least one first terminal and that does not have a function to control progress of the game, the at least one second terminal including a transmitting section that transmits, in accordance with manipulation carried out by a user with respect to the at least one second terminal, message information including at least a message, the at least one first terminal including a receiving section that receives the message information and a message output section that provides, in accordance with the message information, the message via audio output during playing of the game.

With the above configuration, the player is concentrated on playing the game. Therefore, even when a message entered by the user is displayed on a game screen, the player hardly notices the message. With the above configuration, a message is provided via audio output during the playing of the game. This allows the player to easily recognize the message. In addition, since the message is provided via audio output, the message would not hinder the player's eyesight, and would not become an obstacle to game play.

The above-described third information processing system may be configured such that: the message output section determines, as a timing to output the message via audio output, a timing that satisfies a given condition concerning progress of the game.

With the above configuration, in case the message is provided via audio output without consideration of the progress of the game, the audio output of the message may possibly hinder the progress of the game. With the above configuration, the message is provided via audio output at a timing satisfying the given condition concerning the progress of the game. Therefore, it is possible to provide the message via audio output at an effective timing without hindering the progress of the game.

The above-described third information processing system may be configured such that: the at least one first terminal includes a game audio output section that outputs audio corresponding to progress of the game with use of a certain sound source; and the message output section provides the message via audio output with use of the certain sound source.

With the above configuration, the sound source identical to that of the audio corresponding to the progress of the game is used. Consequently, it is possible to provide the message via audio output without giving a sense of incompatibility.

The above-described third information processing system may be configured such that: in accordance with the manipulation, the transmitting section incorporates, into the message information, information indicating a timing to provide the message via audio output during playing of the game; and in accordance with the message information, the message output section provides the message via audio output at the timing during playing of the game.

With the above configuration, the user can designate a timing to provide the message via audio output. A message may give a different impression to the player depending on the timing to provide the message via audio output. With the above configuration, the user can designate a timing that the user considers suitable to provide the message via audio output.

The above-described third information processing system may be configured such that: in accordance with the manipulation, the transmitting section incorporates, into the message information, information indicating a sound source used to provide the message via audio output during playing of the game; and in accordance with the message information, the message output section provides the message via audio output with use of the sound source during playing of the game.

With the above configuration, the user can designate a sound source to be used to provide the message via audio output. A message may give a different impression to the player depending on the sound source to be used. With the above configuration, the user can designate a sound source that the user considers suitable to provide the message via audio output.

The above-described third information processing system may be configured such that: in accordance with the manipulation, the transmitting section incorporates, into the message information, information indicating a consumed amount of a consumption value possessed by the user which consumed amount is associated with the message; and in accordance with the message information, the message output section provides the message via audio output in an output mode corresponding to the consumed amount during playing of the game.

With the above configuration, the message is provided via audio output in the output mode corresponding to the consumed amount of the consumption value. This makes it possible to preferentially treat the user who has consumed more consumption value, for example. In addition, the user can determine the output mode of the message by designating the consumed amount. Thus, the user can effectively cheer on a certain player.

The above-described third information processing system may be configured such that: in accordance with the manipulation, the transmitting section incorporates, into the message information, information indicating a timing to provide the message via audio output during playing of the game or a sound source used to provide the message via audio output during playing of the game; in accordance with the message information, the message output section provides the message via audio output at the timing or with use of the sound source during playing of the game; the information indicating the timing or the sound source indicates any of a plurality of timings or any of a plurality of sound sources; and each of the plurality of timings or each of the plurality of sound sources is associated with a consumed amount of a consumption value possessed by the user, the consumed amount being set, for the each of the plurality of timings or the each of the plurality of sound sources, to be consumed in exchange for audio output of the message at the each of the plurality of timings or with use of the each of the plurality of sound sources during playing of the game.

With the above configuration, different consumed amounts can be set for different timings to provide a message via audio output or for different sound sources used to provide a message via audio output. With this, in a case where ease of recognition of a message varies depending on the timing or sound source, a consumed amount corresponding to the ease of the recognition can be set for each timing or each sound source.

The above-described third information processing system may be configured such that: the at least one second terminal includes a plurality of second terminals; the information processing system further includes a server communicably connected with the at least one first terminal and to the plurality of second terminals; in accordance with the manipulation, the transmitting section incorporates, into the message information, information indicating a consumed amount of a consumption value possessed by the user which consumed amount is to be consumed in exchange for audio output of the message during playing of the game and transmits the message information to the server; and the server transmits, to the at least one first terminal, a piece of message information including information indicating a largest consumed amount among one or more pieces of message information received from the plurality of second terminals.

The above configuration can make users compete against each other in the consumed amount of the consumption value, which is used to provide a message via audio output. This can be amusement for the users.

The above-described third information processing system may be configured such that: the at least one first terminal includes a plurality of first terminals; the information processing system further includes a server communicably connected with the plurality of first terminals and the at least one second terminal; in accordance with the manipulation, the transmitting section incorporates, into the message information, terminal information indicating a first terminal in which the message is to be provided via audio output among the plurality of first terminals, and transmits the message information to the server; and the server includes a selection transmitting section that transmits, to the first terminal indicted by the terminal information included in the message information, the message information received from the at least one second terminal.

With the above configuration, the user can transmit a message to a player on whom the user wishes to cheer. This can increase user's desire to transmit a message.

A third information processing method in accordance with an aspect of the present invention includes the steps of: transmitting, by a second terminal, message information including at least a message in accordance with manipulation carried out with respect to the second terminal, the second terminal being communicably connected with a first terminal that controls progress of a game and not having a function to control progress of the game; receiving, by the first terminal, the message information; and providing, by the first terminal, the message via audio output in accordance with the message information during playing of the game.

The above configuration brings about effects similar to those given by the above-described third information processing system.

A sixth program in accordance with an aspect of the present invention causes a computer, included in a second terminal being communicably connected with a first terminal that controls progress of a game and not having a function to control progress of the game, to execute the steps of: obtaining manipulation information indicating manipulation carried out by a user with respect to the second terminal; and transmitting, in accordance with the manipulation information, message information including at least a message to the first terminal, the message information being information used to provide, in the first terminal, the message via audio output during playing of the game.

The above configuration brings about effects similar to those given by the above-described third information processing system.

A seventh program in accordance with an aspect of the present invention causes a computer, included in a first terminal that controls progress of a game, to execute the steps of: receiving message information including at least a message from a second terminal (i) that is communicably connected with the first terminal, (ii) that does not have a function to control progress of the game, and (iii) that includes a transmitting section which transmits the message information in accordance with manipulation carried out by a user with respect to the second terminal; and providing, in accordance with the message information, the message via audio output during playing of the game.

The above configuration brings about effects similar to those given by the above-described third information processing system.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: information processing system
10: user terminal
20: player terminal
30: game server
40: video distribution server
11, 21, 31: processor
12, 22, 32: communication section
13, 23, 33: input section
14, 24, 34: storage section
15, 25: display section
16, 26: audio output section
110, 210, 310: control section
111: video processing section
112: manipulation information obtaining section
113: message transmitting section
211: game progress section
212: message information receiving section
213: message display section
214: game audio output section
215: message output section
311: message information processing section

The invention claimed is:

1. An information processing system comprising:
at least one first terminal that controls progress of a game; and
at least one second terminal that is communicably connected with the at least one first terminal and that does not have a function to control progress of the game,
wherein the at least one second terminal includes:
a transmitting section that transmits, in accordance with a manipulation carried out by a user with respect to the at least one second terminal, message information including at least (i) a message and (ii) information indicating a scene which is included in a game space where the game progresses and in which the message is to be displayed,
wherein the at least one first terminal includes:
a receiving section that receives the message information; and
a message display section that displays the message in the scene in accordance with the message information, and
wherein the manipulation carried out by the user includes a manipulation of designating the scene in which the message is to be displayed in the game space,
wherein the transmitting section transmits the message information during distribution, to the second terminal, of a video indicating the progress of the game, and
wherein during progress of the game indicated by the video, the message display section displays the message included in the message information.

2. The information processing system as set forth in claim 1, wherein
in accordance with the manipulation, the transmitting section incorporates, into the message information, information indicating a consumed amount of a consumption value possessed by the user which consumed amount is associated with the message, and
the message display section displays, in the scene, the message at a higher exposure degree as the consumed amount increases.

3. The information processing system as set forth in claim 1, wherein
the information indicating the scene indicates any of a plurality of scenes, and
each of the plurality of scenes is associated with a consumed amount of a consumption value possessed by the user which consumed amount is set, for the each of the plurality of scenes, to be consumed in exchange for display of the message in the each of the plurality of scenes.

4. The information processing system as set forth in claim 1, wherein
the information indicating the scene includes information indicating a certain timing in progress of the game, and
the message display section displays the message at the certain timing.

5. The information processing system as set forth in claim 1, wherein
the information indicating the scene includes information indicating a certain position in the game space, and
the message display section displays the message at the certain position.

6. The information processing system as set forth in claim 1, wherein
the at least one first terminal comprises a plurality of first terminals, and
in accordance with the manipulation, the transmitting section determines, from among the plurality of first terminals, a first terminal to which the message information is to be transmitted.

7. The information processing system as set forth in claim 1, wherein
the message display section adjusts an exposure degree of the message to be displayed in the scene.

8. The information processing system as set forth in claim 7, wherein
the message display section of the at least one first terminal adjusts, as an exposure degree of the message to be displayed in the scene, either or both of a display period and a display mode according to which the message is to be displayed.

9. An information processing method comprising:
transmitting, by a second terminal being communicably connected with a first terminal that controls progress of a game and not having a function to control progress of the game, message information in accordance with a manipulation carried out by a user with respect to the second terminal, the message information including at least (i) a message and (ii) information indicating a scene which is included in a game space where the game progresses and in which the message is to be displayed;
receiving, by the first terminal, the message information; and
displaying, by the first terminal, the message in the scene in accordance with the message information,
wherein the manipulation carried out by the user includes a manipulation of designating the scene in which the message is to be displayed in the game space, wherein, in the transmitting, the second terminal transmits the message information during distribution, to the second terminal, of a video indicating the progress of the game, and wherein, in the displaying, during progress of the game indicated by the video, the first terminal displays the message included in the message information.

10. A non-transitory storage medium storing a program that causes a computer, included in a first terminal that controls progress of a game, to execute:

receiving message information from a second terminal (i) that is communicably connected with the first terminal, (ii) that does not have a function to control progress of the game, and (iii) that includes a transmitting section which transmits the message information in accordance with a manipulation carried out by a user with respect to the second terminal, the message information including at least (i) a message and (ii) information indicating a scene which included in a game space where the game progresses and in which the message is to be displayed; and displaying the message in the scene in accordance with the message information, wherein the manipulation carried out by the user includes a manipulation of designating the scene in which the message is to be displayed in the game space, wherein the message information to be received in the receiving is transmitted from the second terminal during distribution, to the second terminal, of a video indicating the progress of the game, and wherein in the displaying, during progress of the game indicated by the video, the computer displays the message included in the message information.

* * * * *